US011835830B2

(12) United States Patent
Sugiyama et al.

(10) Patent No.: US 11,835,830 B2
(45) Date of Patent: Dec. 5, 2023

(54) DISPLAY DEVICE

(71) Applicant: Japan Display Inc., Tokyo (JP)

(72) Inventors: Hiroki Sugiyama, Minato-ku (JP); Yoshihide Ohue, Minato-ku (JP); Manabu Mizuno, Minato-ku (JP); Kentaro Okuyama, Minato-ku (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/727,021

(22) Filed: Apr. 22, 2022

(65) Prior Publication Data

US 2022/0244606 A1 Aug. 4, 2022

Related U.S. Application Data

(63) Continuation of application No. 17/331,732, filed on May 27, 2021, now Pat. No. 11,340,508, which is a (Continued)

(30) Foreign Application Priority Data

Dec. 5, 2018 (JP) ................. 2018-228538

(51) Int. Cl.
*G02F 1/1333* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136209* (2013.01)

(58) Field of Classification Search
CPC .................................................. G02F 1/1362
See application file for complete search history.

(56) References Cited

U.S. PATENT DOCUMENTS 10,345,639 B1 7/2019 Nakagawa
2001/0030717 A1* 10/2001 Kaneko ............. G02F 1/134363
349/46
(Continued)

FOREIGN PATENT DOCUMENTS

JP 2008-225155 A 9/2008
JP 2012-174778 9/2012
(Continued)

OTHER PUBLICATIONS

International Search Report dated Feb. 10, 2020 in PCT/JP2019/047490 filed on Dec. 4, 2019, 2 pages.
(Continued)

*Primary Examiner* — Sang V Nguyen
(74) *Attorney, Agent, or Firm* — Maier & Maier, PLLC

(57) ABSTRACT

A display device according to an aspect includes: an array substrate including a plurality of first light-transmitting electrodes each disposed in a corresponding one of pixels; a counter substrate including positions that overlap the first light-transmitting electrodes in a plan view and are provided with a second light-transmitting electrode; a liquid crystal layer including polymer-dispersed liquid crystals filled between the array substrate and the counter substrate; and at least one light emitter configured to emit light toward a side surface of the counter substrate. The array substrate includes, in each of the pixels, a third light-transmitting electrode and a conductive metal layer. The third light-transmitting electrode at least partially overlaps the first light-transmitting electrode in the plan view with an inorganic insulating layer interposed therebetween, and the conductive metal layer is stacked on the third light-transmitting electrode.

20 Claims, 23 Drawing Sheets

Related U.S. Application Data continuation of application No. PCT/JP2019/047490, filed on Dec. 4, 2019.

(56) References Cited

U.S. PATENT DOCUMENTS

| | | | |
|---|---|---|---|
| 2002/0008798 A1* | 1/2002 | Song | G02F 1/13458 349/43 |
| 2003/0063233 A1 | 4/2003 | Takagi | |
| 2007/0268438 A1* | 11/2007 | Nakamura | G02F 1/136227 349/138 |
| 2007/0279374 A1* | 12/2007 | Kimura | G02F 1/133555 345/102 |
| 2008/0036959 A1* | 2/2008 | Yang | G02F 1/13394 349/155 |
| 2009/0059110 A1* | 3/2009 | Sasaki | G02F 1/136227 349/114 |
| 2010/0012939 A1* | 1/2010 | Ishii | G02F 1/136213 257/59 |
| 2012/0182274 A1* | 7/2012 | Nakahara | G02F 1/136213 345/204 |
| 2012/0326151 A1 | 12/2012 | Zhan et al. | |
| 2016/0377913 A1 | 12/2016 | Yeh | |
| 2017/0371193 A1 | 12/2017 | Katsuta | |
| 2018/0031758 A1* | 2/2018 | Mizuno | G02B 6/0076 |
| 2020/0150490 A1 | 5/2020 | Mizuno et al. | |
| 2020/0166796 A1* | 5/2020 | Okuyama | G02F 1/133615 |

FOREIGN PATENT DOCUMENTS

| | | |
|---|---|---|
| JP | 2013-073032 A | 4/2013 |
| JP | 2018-021974 A | 2/2018 |
| WO | WO 2011/040085 A1 | 4/2011 |

OTHER PUBLICATIONS

Office Action dated Nov. 7, 2022, in corresponding German Application No. 112019005627.1, 14 pages.

Office Action dated Aug. 23, 2022 in corresponding Japanese Application No. 2018-228538 (7 pages, including English translation).

\* cited by examiner

DISPLAY DEVICE

CROSS-REFERENCE TO RELATED APPLICATION

This application is a continuation of U.S. application Ser. No. 17/331,732 filed May 27, 2021, and which claims the benefit of priority from Japanese Patent Application No. 2018-228538 filed on Dec. 5, 2018 and International Patent Application No. PCT/JP2019/047490 filed on Dec. 4, 2019, the entire contents of each of which are incorporated herein by reference.

BACKGROUND

1. Technical Field

What is disclosed herein relates to a display device.

2. Description of the Related Art

Japanese Patent Application Laid-open Publication No. 2018-021974 (JP-A-2018-021974) describes a display device including a first light-transmitting substrate, a second light-transmitting substrate disposed so as to be opposed to the first light-transmitting substrate, a liquid crystal layer including polymer-dispersed liquid crystals filled between the first light-transmitting substrate and the second light-transmitting substrate, and at least one light emitter disposed so as to be opposed to at least one of side surfaces of the first light-transmitting substrate and the second light-transmitting substrate.

Since the display device described in JP-A-2018-021974 is driven by what is called a field-sequential system, it is preferable to reduce the time for selecting scanning lines while preventing degradation in display quality such as occurrence of flickers.

For the foregoing reasons, there is a need for a display device that is driven by the field-sequential system and is capable of improving visibility of images displayed on a display panel.

SUMMARY

A display device according to an aspect includes: an array substrate including a plurality of first light-transmitting electrodes each disposed in a corresponding one of pixels; a counter substrate including positions that overlap the first light-transmitting electrodes in a plan view and are provided with a second light-transmitting electrode; a liquid crystal layer including polymer-dispersed liquid crystals filled between the array substrate and the counter substrate; and at least one light emitter configured to emit light toward a side surface of the counter substrate. The array substrate includes, in each of the pixels, a third light-transmitting electrode and a conductive metal layer. The third light-transmitting electrode at least partially overlaps the first light-transmitting electrode in the plan view with an inorganic insulating layer interposed therebetween, and the conductive metal layer is stacked on the third light-transmitting electrode.

DETAILED DESCRIPTION

Figure 1:
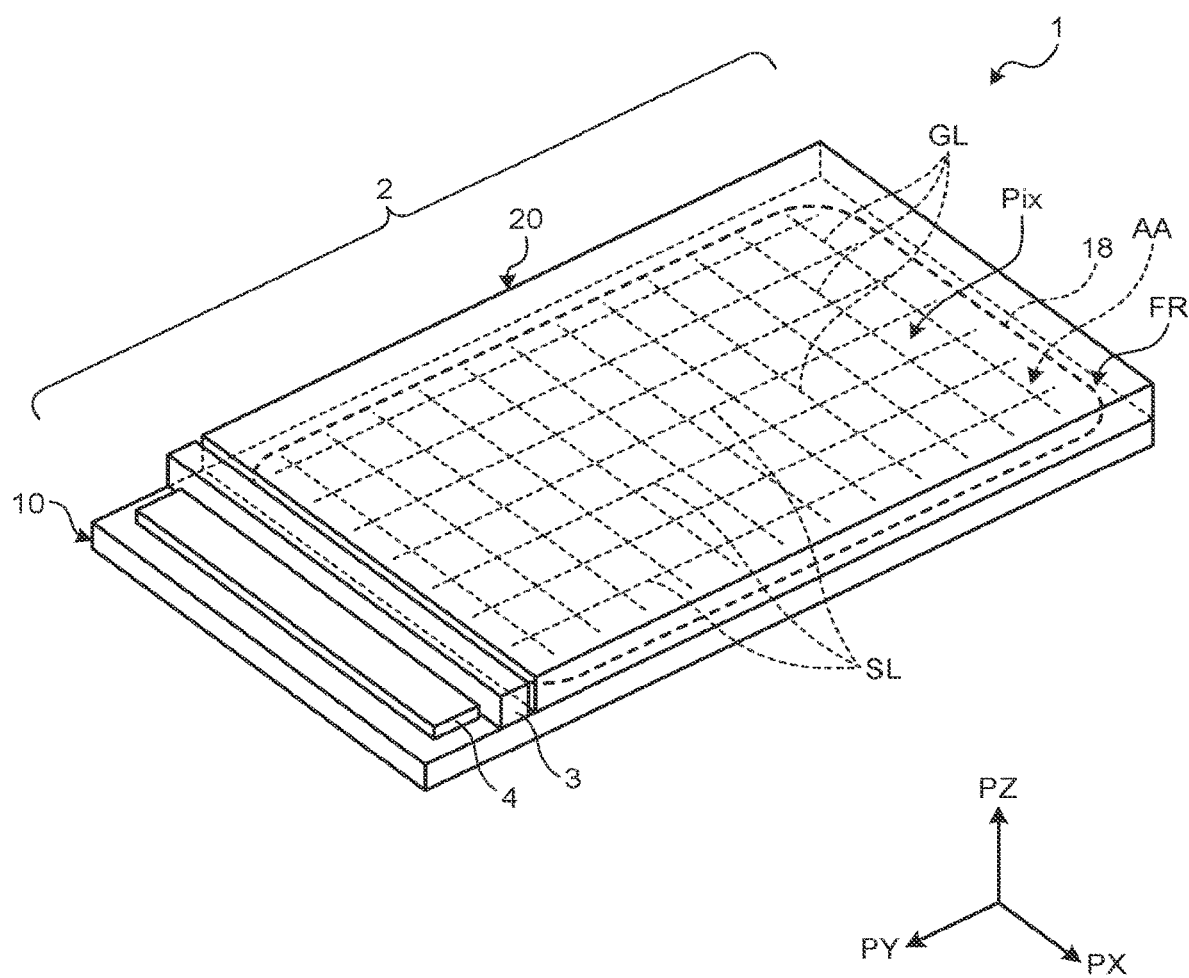
FIG. 1 is a perspective view illustrating an example of a display device according to an embodiment.

The following describes forms (embodiments) for carrying out the present disclosure in detail with reference to the drawings. The present disclosure is not limited to the description of the embodiments to be given below. Components to be described below include those easily conceivable by those skilled in the art or those substantially identical thereto. Moreover, the components to be described below can be appropriately combined. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts are schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
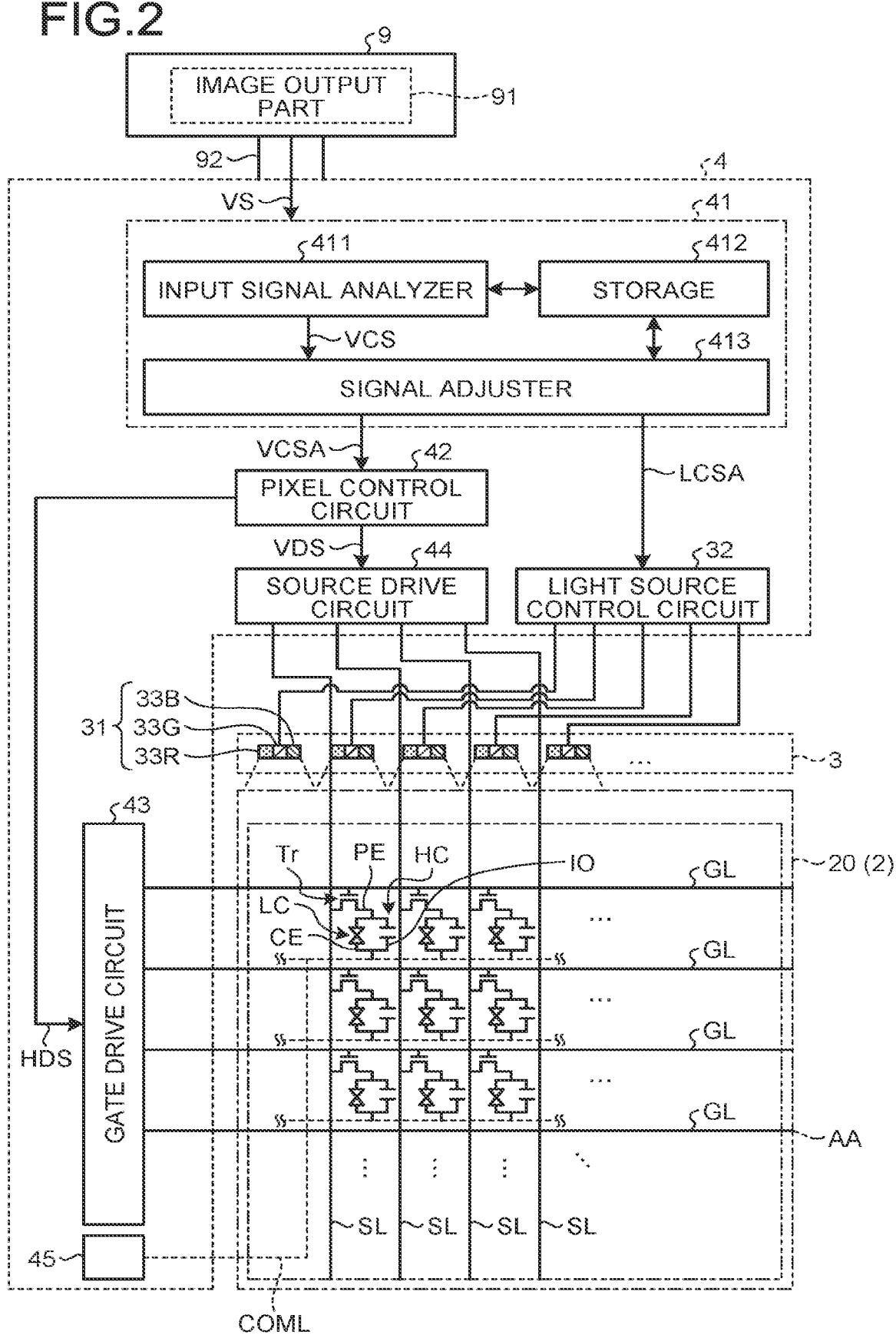
FIG. 2 is a block diagram illustrating the display device according to a first embodiment.
Figure 3:
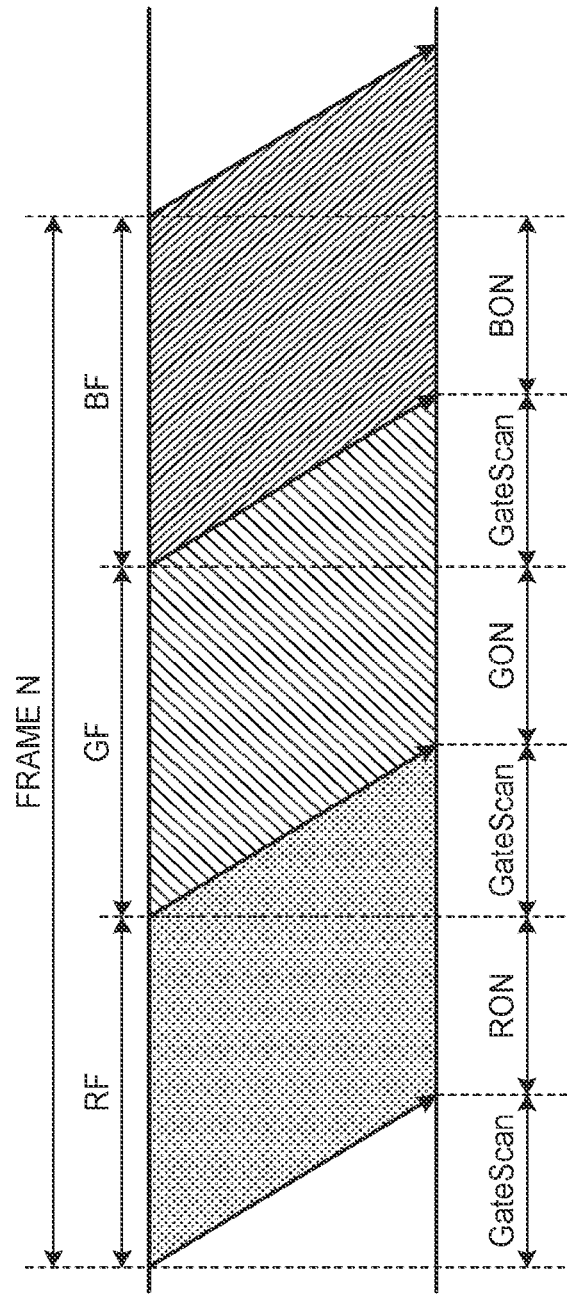
FIG. 3 is a timing diagram explaining timing of light emission by a light source in a field-sequential system according to the first embodiment.

FIG. 1 is a perspective view illustrating an example of a display device according to the present embodiment. FIG. 2 is a block diagram illustrating the display device of FIG. 1. FIG. 3 is a timing diagram explaining timing of light emission by a light source in a field-sequential system.

As illustrated in FIG. 1, a display device 1 includes a display panel 2, a side light source 3, and a drive circuit 4. A PX direction denotes one direction on the plane of the display panel 2. A second direction PY denotes a direction orthogonal to the PX direction. A third direction PZ denotes a direction orthogonal to a PX-PY plane.

Figure 5:
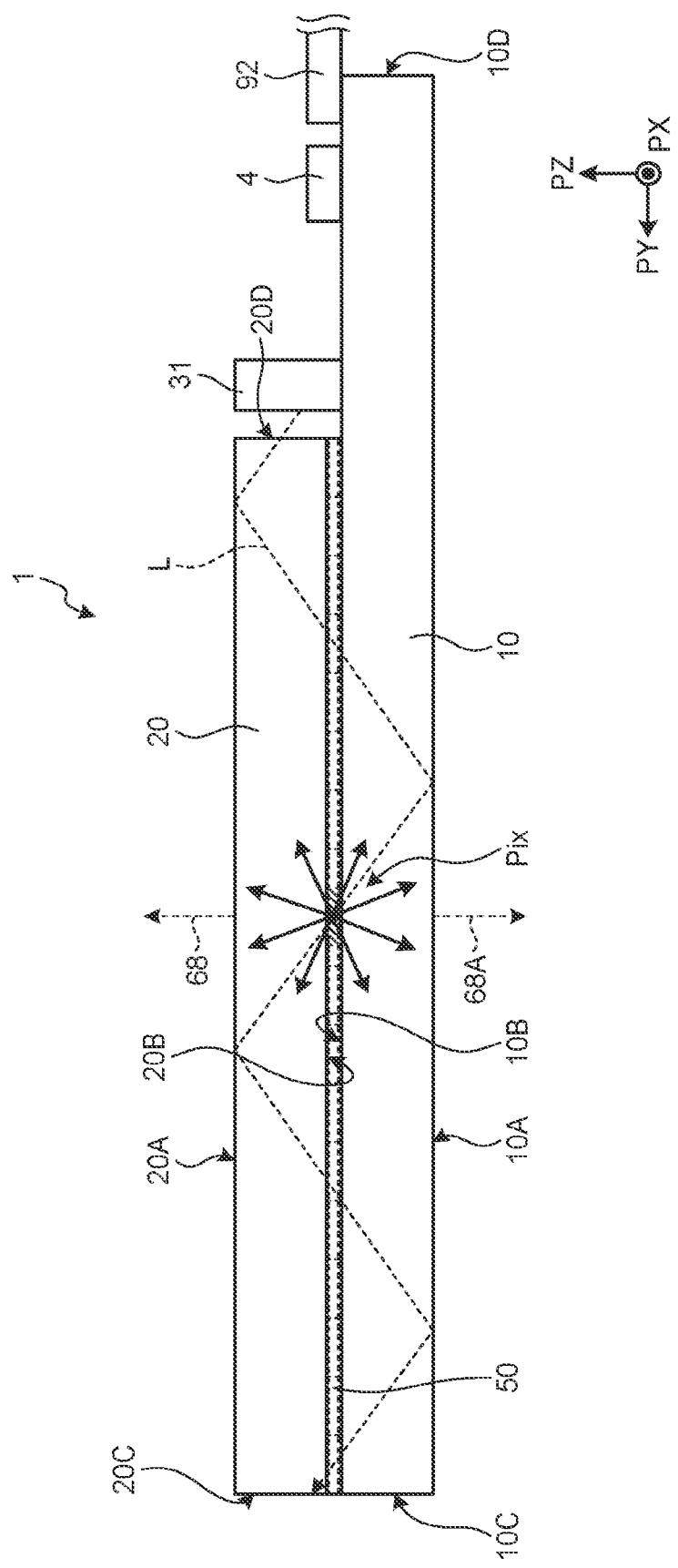
FIG. 5 is a sectional view illustrating an exemplary section of the display device of FIG. 1.

The display panel 2 includes an array substrate 10, a counter substrate 20, and a liquid crystal layer 50 (refer to FIG. 5). The counter substrate 20 is opposed to a surface of the array substrate 10 in a direction orthogonal thereto (in the PZ direction in FIG. 1). Polymer dispersed liquid crystals LC (to be described later) are sealed in the liquid crystal layer 50 (refer to FIG. 5) by the array substrate 10, the counter substrate 20, and a sealing part 18.

As illustrated in FIG. 1, the display panel 2 has a display region AA capable of displaying images and a peripheral region FR outside the display region AA. A plurality of pixels Pix are arranged in a matrix having a row-column configuration in the display region AA. In the present disclosure, a row refers to a pixel row including m pixels Pix arranged in one direction, and a column refers to a pixel column including n pixels Pix arranged in a direction orthogonal to the direction in which the rows extend. The values of m and n are defined in accordance with a display resolution in the vertical direction and a display resolution in the horizontal direction. A plurality of scanning lines GL are arranged corresponding to the rows, and a plurality of signal lines SL are arranged corresponding to the columns.

The side light source 3 includes a plurality of light emitters 31. As illustrated in FIG. 2, a light source controller (light source control circuit) 32 is included in the drive circuit 4. The light source controller 32 may be a circuit separate from the drive circuit 4. The light emitters 31 are electrically coupled to the light source controller 32 through wiring in the array substrate 10.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area larger than that of the counter substrate 20 in an X-Y plane, and the drive circuit 4 is provided on an projecting portion of the array substrate 10 exposed from the counter substrate 20.

The signal processing circuit 41 receives an input signal (such as a red-green-blue (RGB) signal) VS from an image output part 91 of an external host controller 9 through a flexible substrate 92.

The signal processing circuit 41 includes an input signal analyzer 411, a storage 412, and a signal adjuster 413. The input signal analyzer 411 generates a second input signal VCS based on an externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42 and transmits a light source control signal LCSA to the light source controller 32. The light source control signal LCSA is a signal including information on light quantities of the light emitters 31 set in accordance with, for example, input gradation values given to the pixels Pix. For example, the light quantities of the light emitters 31 are set smaller when a darker image is displayed, and set larger when a brighter image is displayed.

The pixel control circuit 42 generates a horizontal drive signal HDS and a vertical drive signal VDS based on the third input signal VCSA. In the present embodiment, since the display device 1 is driven by the field-sequential system, the horizontal drive signal HDS and the vertical drive signal VDS are generated for each color emittable by the light emitter 31.

The gate drive circuit 43 sequentially selects the scanning lines GL of the display panel 2 based on the horizontal drive signal HDS during one vertical scanning period. The scanning lines GL can be selected in any order.

The source drive circuit 44 supplies a gradation signal depending on the output gradation value of each of the pixels Pix to a corresponding one of the signal lines SL of the display panel 2 based on the vertical drive signal VDS during one horizontal scanning period.

In the present embodiment, the display panel 2 is an active-matrix panel. Hence, the display panel 2 includes the signal (source) lines SL extending in the second direction PY and the scanning (gate) lines GL extending in the first direction PX in a plan view, and includes switching elements Tr at intersecting portions between the signal lines SL and the scanning lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to a corresponding one of the signal lines SL, and the gate electrode of the switching element Tr is coupled to a corresponding one of the scanning lines GL. The other of the source electrode and the drain electrode is coupled to one end of a capacitance (to be described later) of the polymer-dispersed liquid crystal LC. The capacitance of the polymer-dispersed liquid crystal LC is coupled at one end thereof to the switching element Tr through a pixel electrode PE, and coupled at the other end thereof to common potential wiring COML through a common electrode CE. A holding capacitance HC is formed between the pixel electrode PE and a holding capacitance electrode IO electrically coupled to the common potential wiring COML. A potential of the common potential wiring COML is supplied by the common potential drive circuit 45.

Each of the light emitters 31 includes a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines SL, only the first color is lit up during the first color light emission period RON.

Then, in a second sub-frame (second predetermined time) GF, the light emitter 33G of the second color emits light during a second color light emission period GON, and the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines SL, only the second color is lit up during the second color light emission period GON.

Further, in a third sub-frame (third predetermined time) BF, the light emitter 33B of the third color emits light during a third color light emission period BON, and the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines SL, only the third color is lit up during the third color light emission period BON.

Since a human eye has limited temporal resolving power and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 4:
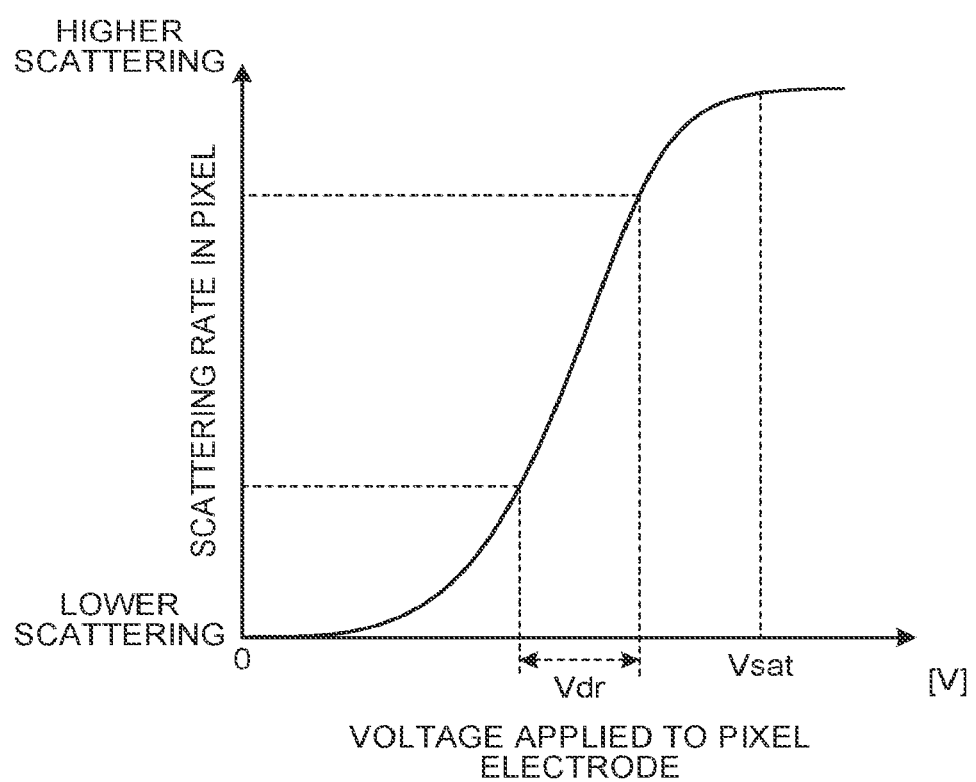
FIG. 4 is an explanatory diagram illustrating a relation between a voltage applied to a pixel electrode and a scattering state of a pixel.
Figure 6:
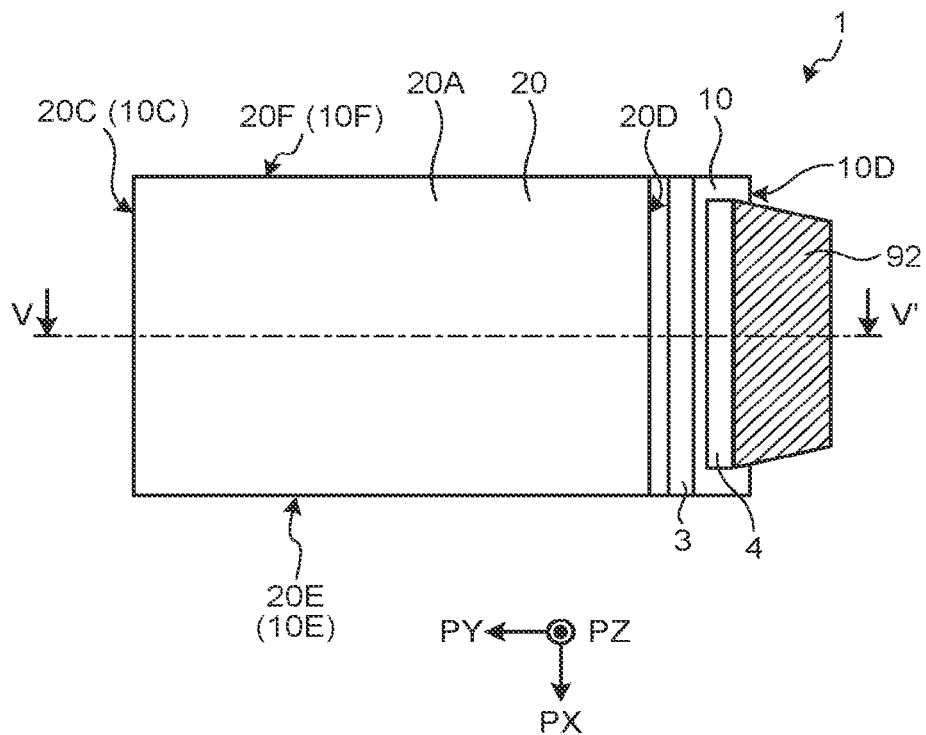
FIG. 6 is a plan view illustrating a planar surface of the display device of FIG. 1.
Figure 7:
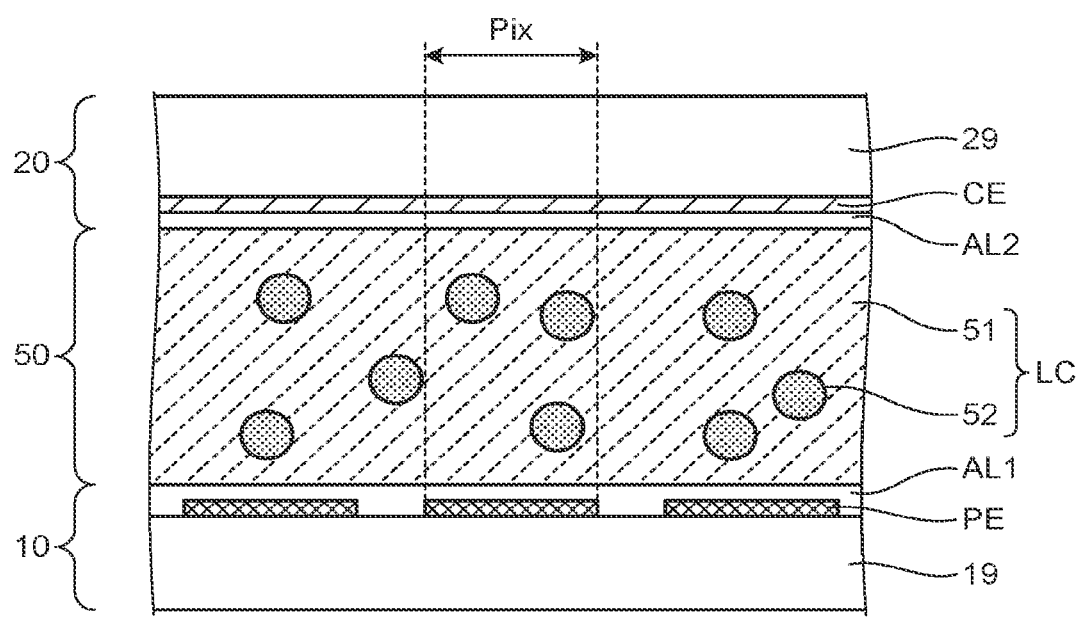
FIG. 7 is an enlarged sectional view obtained by enlarging a liquid crystal layer portion of FIG. 5.
Figure 8:
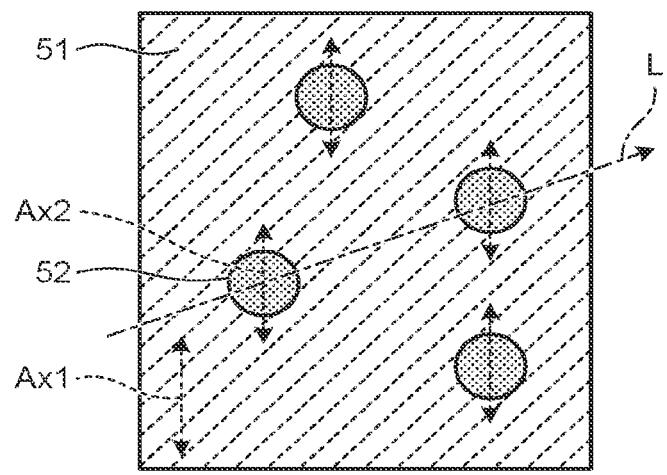
FIG. 8 is a sectional view for explaining a non-scattering state in the liquid crystal layer.
Figure 9:
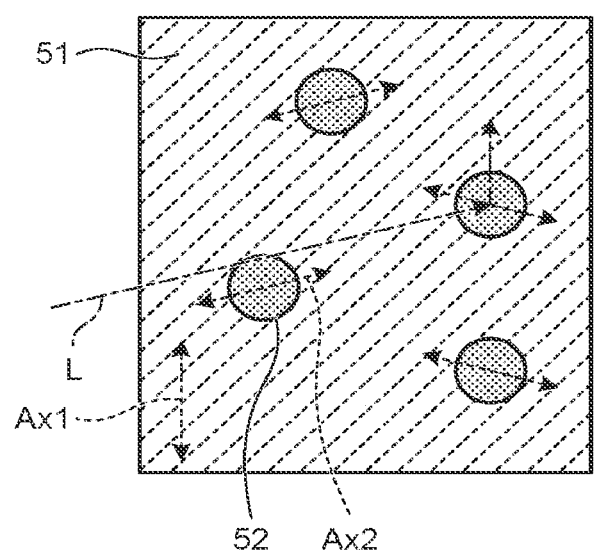
FIG. 9 is a sectional view for explaining the scattering state in the liquid crystal layer.

FIG. 4 is an explanatory diagram illustrating a relation between a voltage applied to the pixel electrode and the scattering state of the pixel. FIG. 5 is a sectional view illustrating an exemplary section of the display device of FIG. 1. FIG. 6 is a plan view illustrating a planar surface of the display device of FIG. 1. FIG. 5 illustrates a V-V' section of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal depending on the output gradation value of each of the pixels Pix is supplied to the above-described signal lines SL for the pixels Pix selected during one vertical scanning period GateScan, a voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled in accordance with the voltage applied to the pixel electrode PE, and, as illustrated in FIG. 4, the scattering rate in the pixels Pix changes.

As illustrated in FIG. 4, the change in the scattering rate in the pixel Pix is smaller when the voltage applied to the pixel electrode PE is equal to or higher than a saturation voltage Vsat. Therefore, the drive circuit 4 changes the voltage applied to the pixel electrode PE in accordance with the vertical drive signal VDS in a voltage range Vdr lower than the saturation voltage Vsat.

As illustrated in FIGS. 5 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel surfaces. The first side surface 10C and the second side surface 10D are parallel surfaces. The third side surface 10E and the fourth side surface 10F are parallel surfaces.

As illustrated in FIGS. 5 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel surfaces. The first side surface 20C and the second side surface 20D are parallel surfaces. The third side surface 20E and the fourth side surface 20F are parallel surfaces.

As illustrated in FIGS. 5 and 6, the light emitters 31 are opposed to the second side surface 20D of the counter substrate 20. As illustrated in FIG. 5, the light emitters 31 emit light-source light L to the second side surface 20D of the counter substrate 20. The second side surface 20D of the counter substrate 20 opposed to the light emitters 31 serves as a surface of light incidence.

As illustrated in FIG. 5, the light-source light L emitted from the light emitter 31 propagates in a direction away from the second side surface 20D while being reflected by the first principal surface 10A of the array substrate 10 and the first principal surface 20A of the counter substrate 20. When the light-source light L travels outward from the first principal surface 10A of the array substrate 10 or the first principal surface 20A of the counter substrate 20, the light-source light L enters a medium having a lower refractive index from a medium having a higher refractive index. Hence, if the angle of incidence of the light-source light L incident on the first principal surface 10A of the array substrate 10 or the first principal surface 20A of the counter substrate 20 is larger than a critical angle, the light-source light L is fully reflected by the first principal surface 10A of the array substrate 10 or the first principal surface 20A of the counter substrate 20.

As illustrated in FIG. 5, the light-source light L that has propagated in the array substrate 10 and the counter substrate 20 is scattered by the pixels Pix including liquid crystals placed in the scattering state, and the angle of incidence of the scattered light becomes an angle smaller than the critical angle. Thus, emission light 68 or 68A is emitted outward from the first principal surface 20A of the counter substrate 20 or the first principal surface 10A of the array substrate 10. The emission light 68 or 68A emitted outward from the first principal surface 20A of the counter substrate 20 or the first principal surface 10A of the array substrate 10 is viewed by the viewer. The following describes the polymer-dispersed liquid crystals placed in the scattering state and the polymer-dispersed liquid crystals in the non-scattering state, using FIGS. 7 to 9.

As illustrated in FIG. 7, the array substrate 10 is provided with a first orientation film AL1, and the counter substrate 20 is provided with a second orientation film AL2. The first and the second orientation films AL1 and AL2 are, for example, vertical orientation films.

A solution containing the liquid crystals and a monomer is filled between the array substrate 10 and the counter substrate 20. Then, in a state where the monomer and the liquid crystals are oriented by the first and the second orientation films AL1 and AL2, the monomer is polymerized by ultraviolet rays or heat to form a bulk 51. This process forms the liquid crystal layer 50 including reverse-mode polymer-dispersed liquid crystals LC in which the liquid crystals are dispersed in gaps of a polymer network formed in a mesh shape.

In this manner, the polymer-dispersed liquid crystals LC contain the bulk 51 formed of the polymer and a plurality of fine particles 52 dispersed in the bulk 51. The fine particles 52 contain the liquid crystals. Both the bulk 51 and the fine particles 52 have optical anisotropy.

The orientation of the liquid crystals contained in the fine particles 52 is controlled by a voltage difference between the pixel electrode PE and the common electrode CE. The orientation of the liquid crystals is changed by the voltage applied to the pixel electrode PE. The degree of scattering of light passing through the pixels Pix changes with change in the orientation of the liquid crystals.

For example, as illustrated in FIG. 8, when no voltage is applied between the pixel electrode PE and the common electrode CE, the direction of an optical axis Ax1 of the bulk 51 is equal to the direction of an optical axis Ax2 of the fine particles 52. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether a voltage is applied.

Ordinary-ray refractive indices of the bulk 51 and the fine particles 52 are equal to each other. When no voltage is applied between the pixel electrode PE and the common electrode CE, the difference of refractive index between the bulk 51 and the fine particles 52 is zero in all directions. The liquid crystal layer 50 is placed in the non-scattering state of not scattering the light-source light L. The light-source light L propagates in a direction away from the light emitter 31 while being reflected by the first principal surface 10A of the array substrate 10 and the first principal surface 20A of the counter substrate 20. When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 9, in the space between the pixel electrode PE having a voltage applied thereto and the common electrode CE, the optical axis Ax2 of the fine particles 52 is inclined by an electric field generated between the pixel electrode PE and the common electrode CE. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode PE having a voltage applied thereto. As described above, the viewer views a part of the scattered light-source light L emitted outward from the first principal surface 10A of the array substrate 10 or the first principal surface 20A of the counter substrate 20.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is entered from the image output part 91, a voltage is applied to the pixel electrode PE of the pixel Pix for displaying an image, and the image based on the third input signal VCSA becomes visible together with the background.

The light-source light L is scattered in the pixel Pix including the pixel electrode PE having a voltage applied thereto, and emitted outward to display the image, which is displayed so as to be superimposed on the background. In other words, the display device 1 of the present embodiment combines the emission light 68 or the emission light 68A with the background to display the image so as to be superimposed on the background.

A potential of each of the pixel electrodes PE (refer to FIG. 7) written during the one vertical scanning period GateScan illustrated in FIG. 3 needs to be held during at least one of the first color light emission period RON, the second color light emission period GON, and the third color light emission period BON coming after the one vertical scanning period GateScan. If the written potential of each of the pixel electrodes PE (refer to FIG. 7) cannot be held during at least one of the first color light emission period RON, the second color light emission period GON, and the third color light emission period BON coming after the one vertical scanning period GateScan, what are called flickers are likely to occur. In other words, in order to shorten the one vertical scanning period GateScan serving as a time for selecting the scanning lines and increase the visibility in the driving using what is called the field-sequential system, the written potential of each of the pixel electrodes PE (refer to FIG. 7) is required to be easily held during each of the first color light emission period RON, the second color light emission period GON, and the third color light emission period BON.

Figure 10:
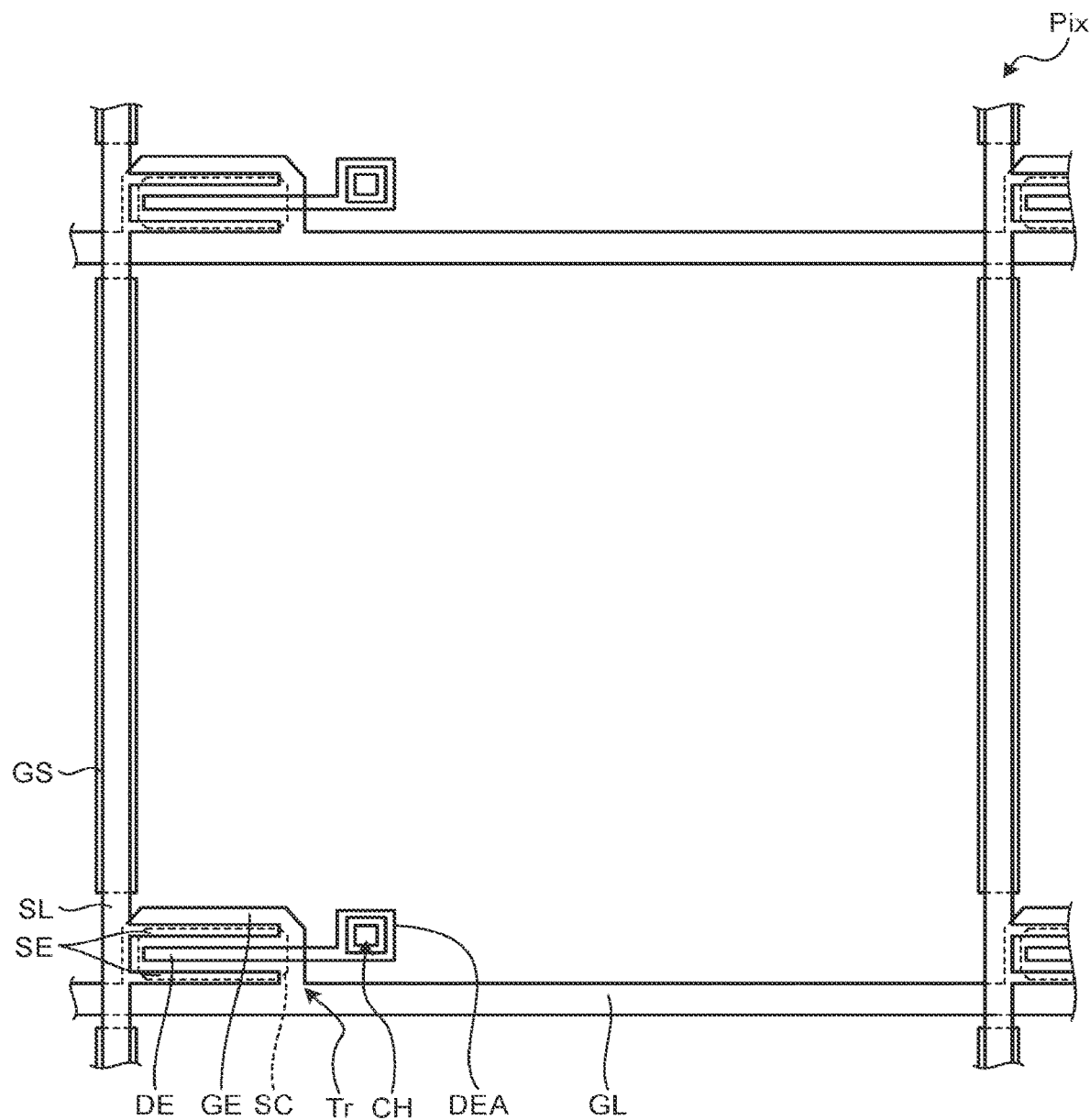
FIG. 10 is a plan view illustrating a scanning line, a signal line, and a switching element in the pixel.
Figure 11:
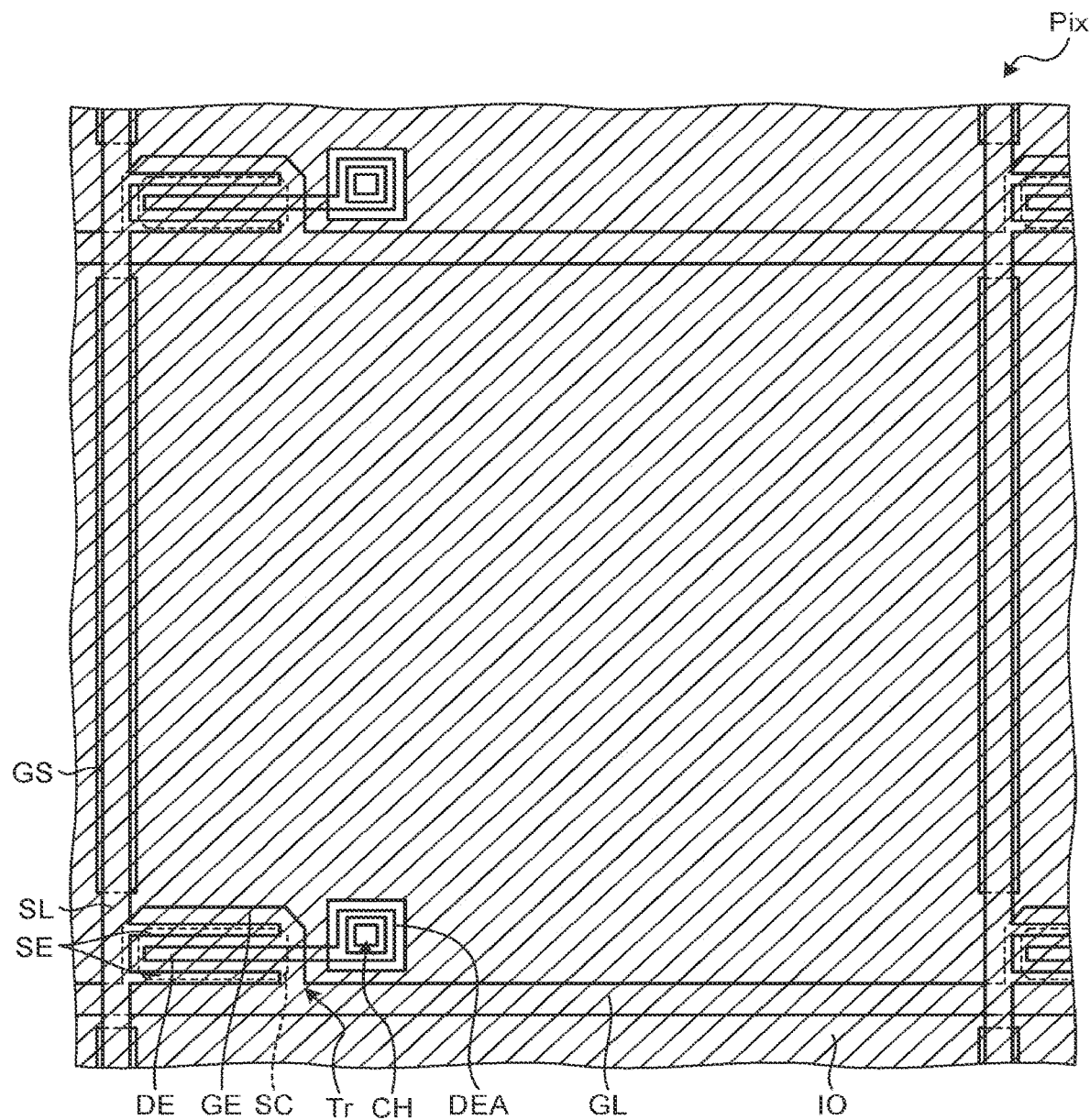
FIG. 11 is a plan view illustrating a holding capacitance layer in the pixel.
Figure 12:
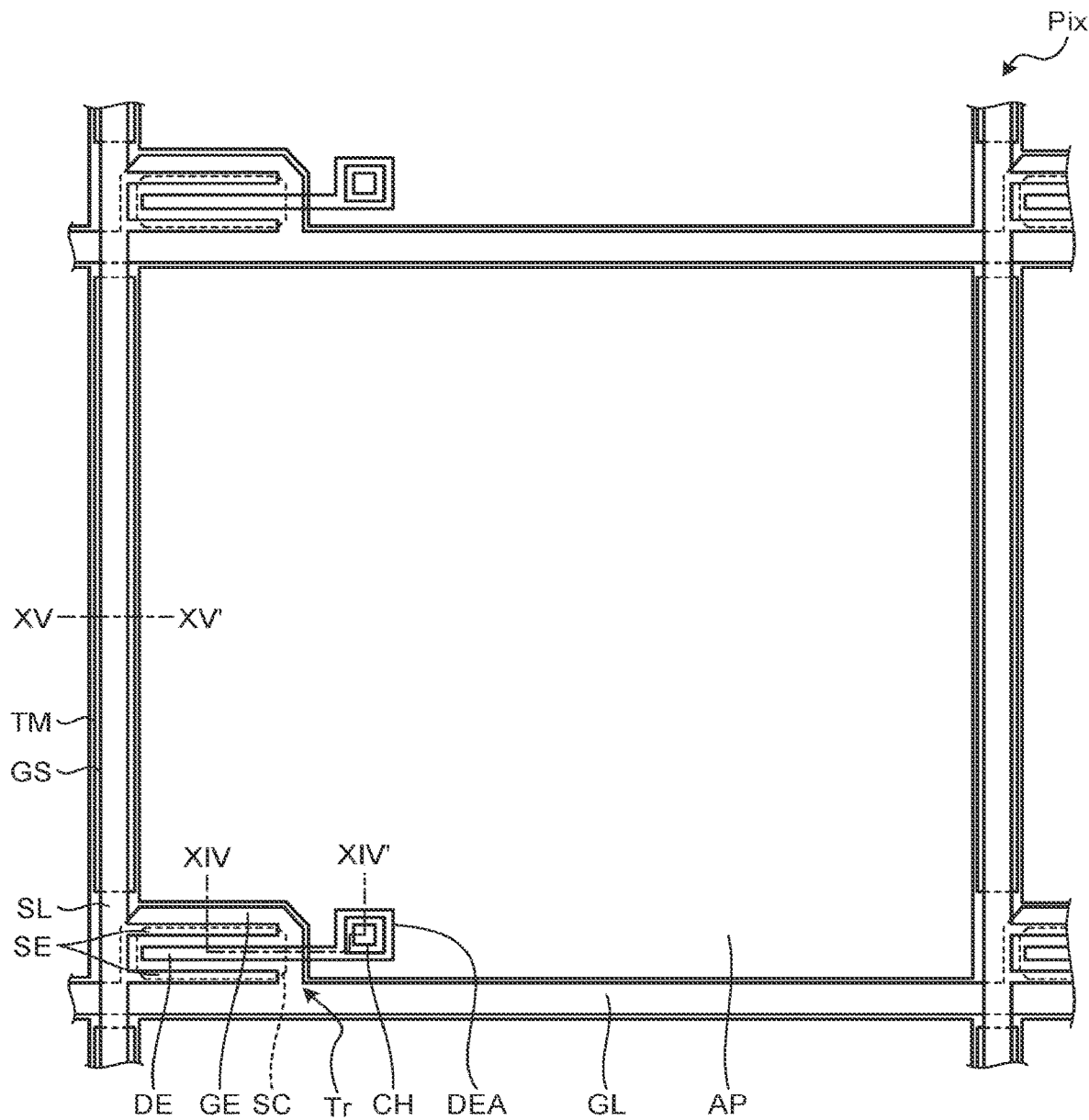
FIG. 12 is a plan view illustrating an auxiliary metal layer and an opening region in the pixel.
Figure 13:
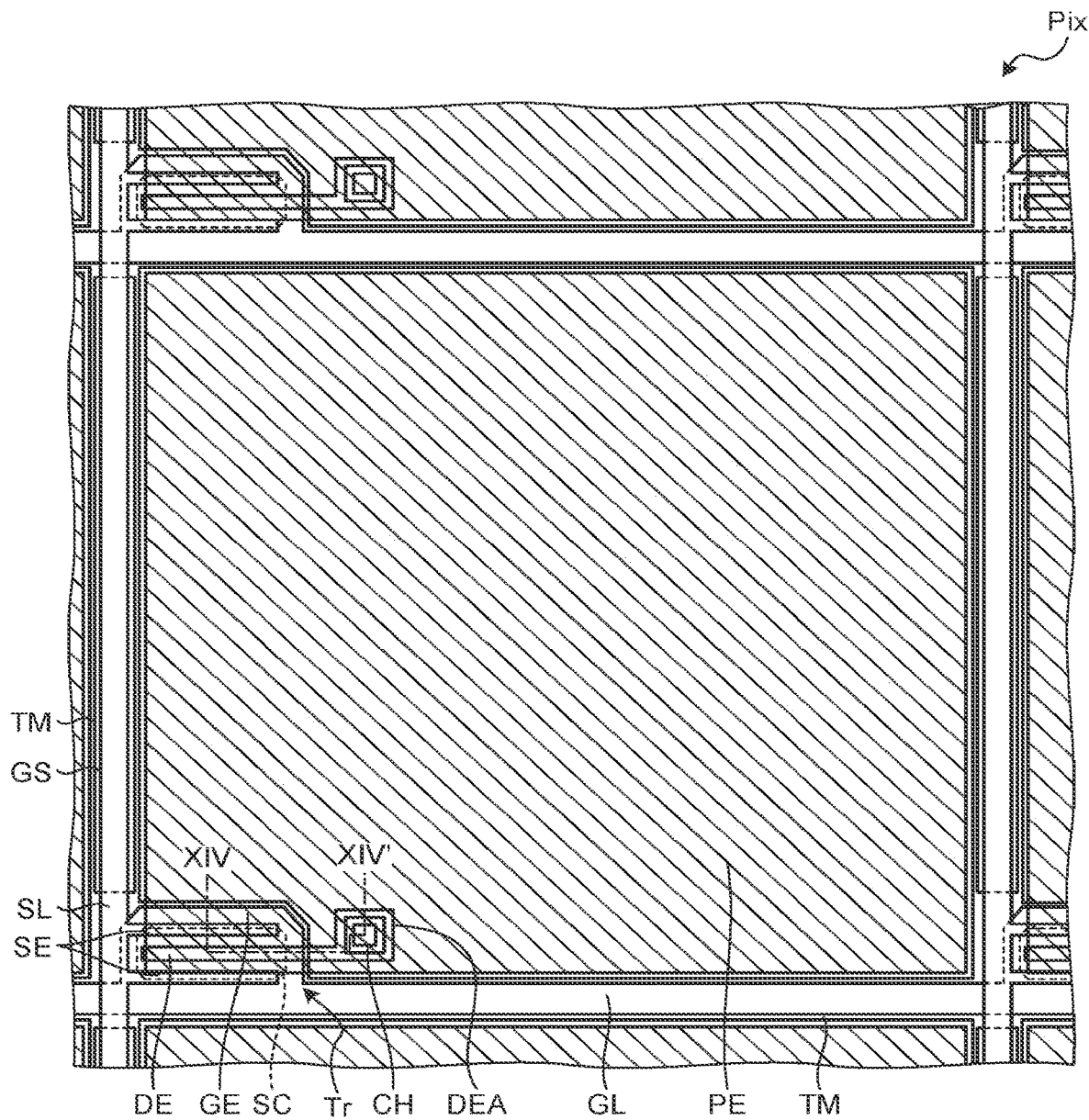
FIG. 13 is a plan view illustrating a pixel electrode in the pixel.
Figure 14:
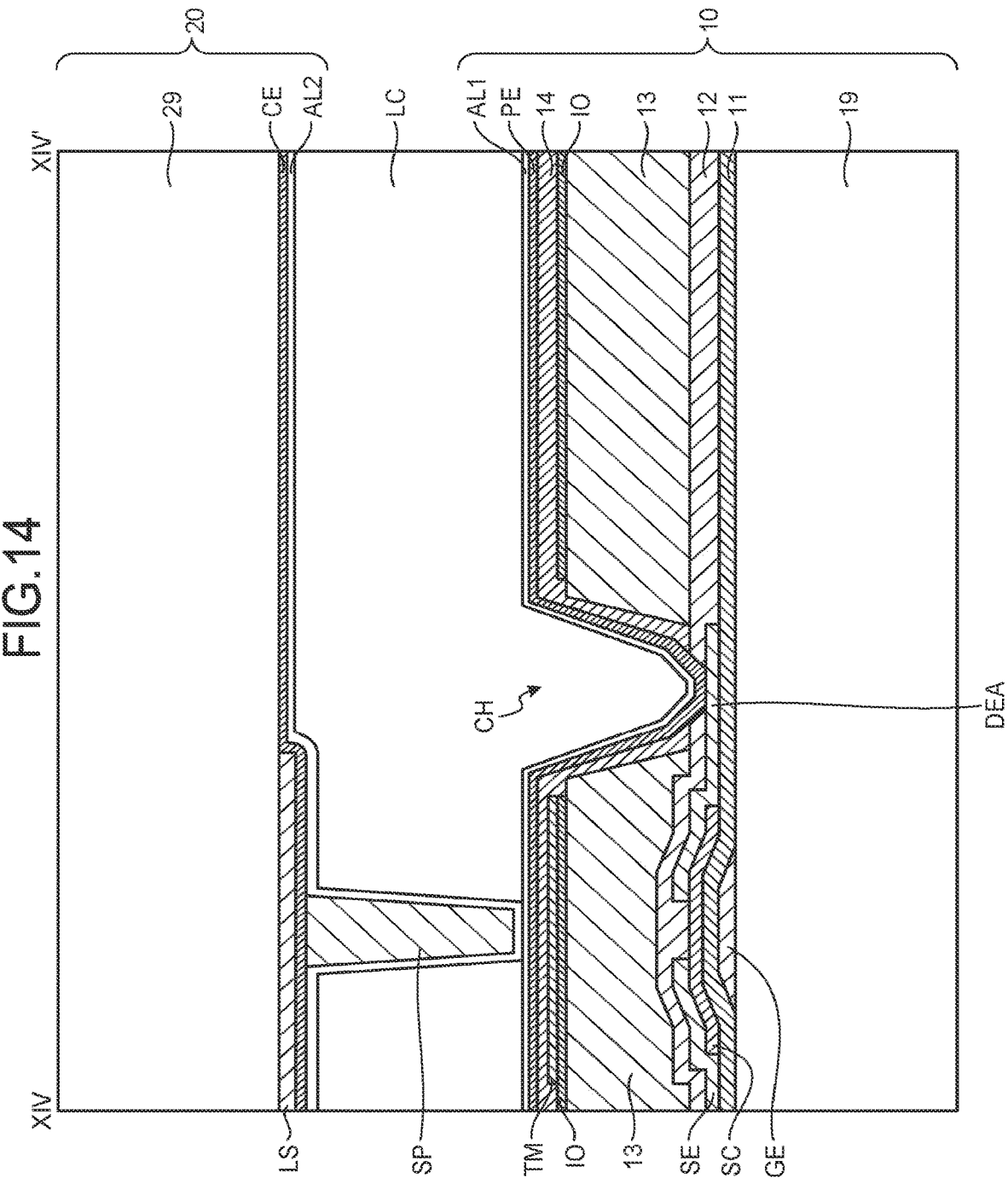
FIG. 14 is a sectional view along XIV-XIV' of FIG. 12.
Figure 15:
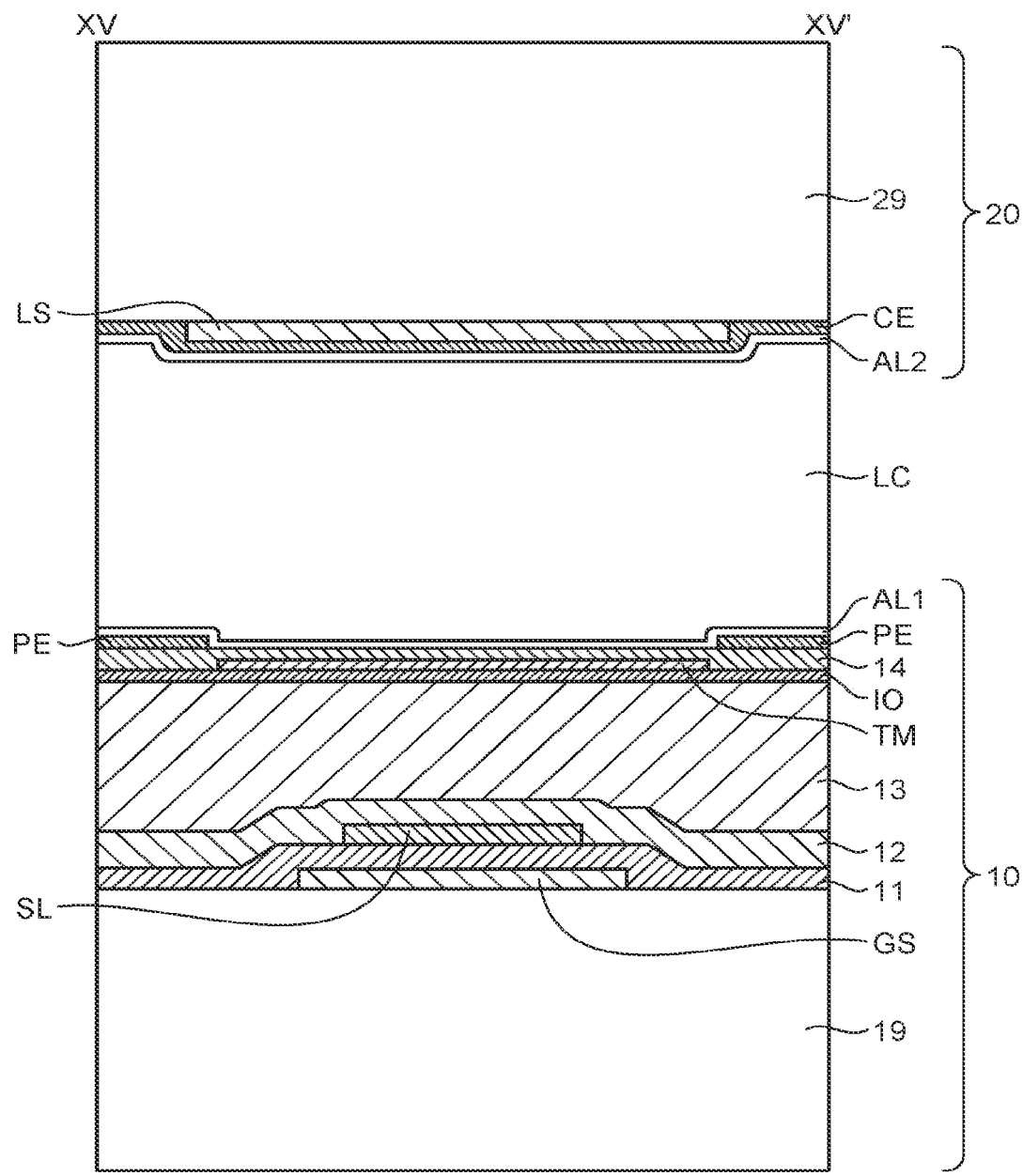
FIG. 15 is a sectional view along XV-XV' of FIG. 12.
Figure 16:
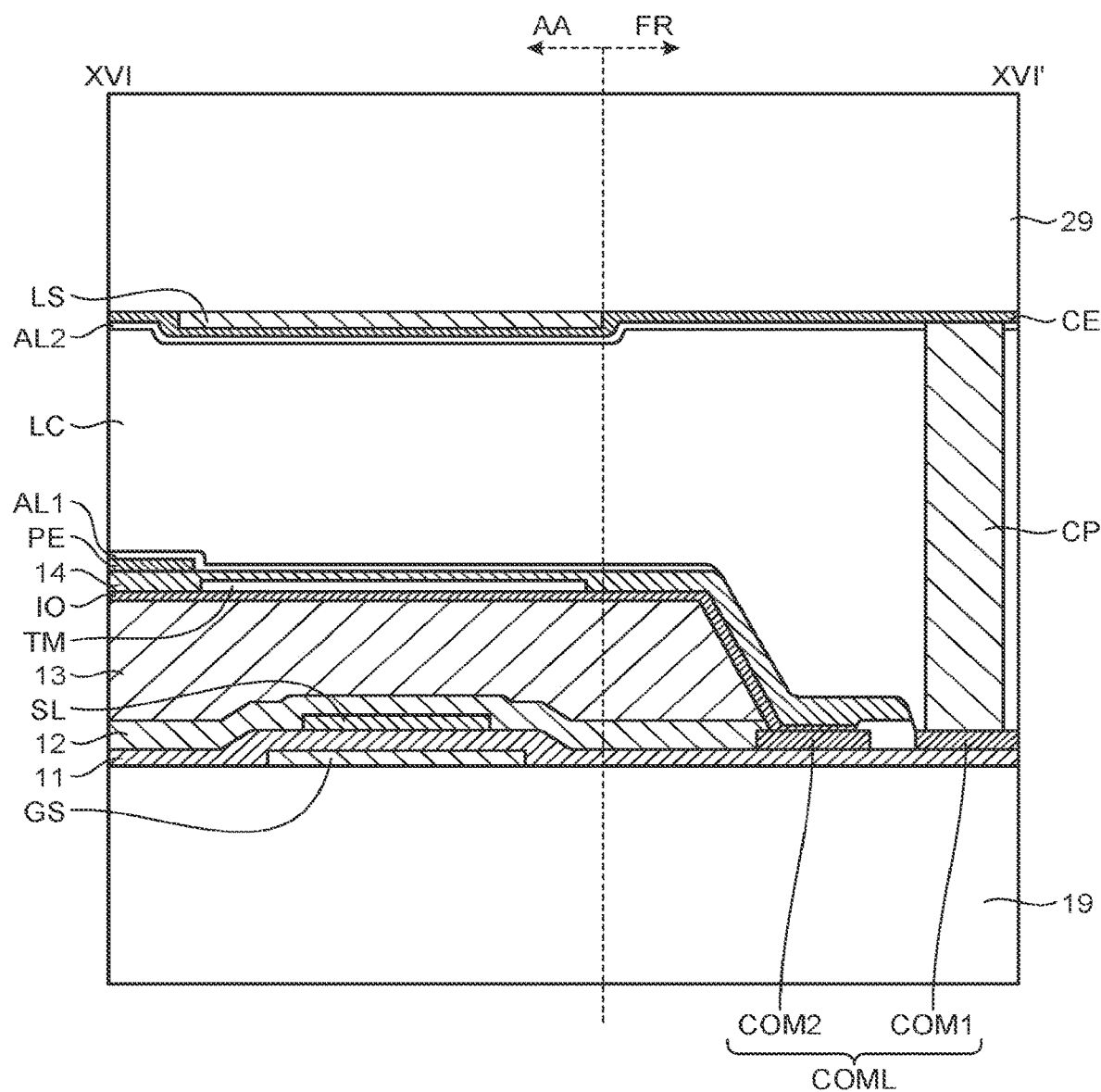
FIG. 16 is a sectional view of a peripheral region.

FIG. 10 is a plan view illustrating the scanning lines, the signal lines, and the switching element in the pixel. FIG. 11 is a plan view illustrating a holding capacitance layer in the pixel. FIG. 12 is a plan view illustrating an auxiliary metal layer and an opening region in the pixel. FIG. 13 is a plan view illustrating the pixel electrode in the pixel. FIG. 14 is a sectional view along XIV-XIV' of FIG. 12. FIG. 15 is a sectional view along XV-XV' of FIG. 12. FIG. 16 is a sectional view of the peripheral region. As illustrated in FIGS. 1, 2, and 10, the array substrate 10 is provided with the signal lines SL and the scanning lines GL so as to form a grid in the plan view. In other words, one surface of the array substrate 10 is provided with the signal lines arranged in the first direction PX with spaces therebetween and the scanning lines arranged in second direction PY with spaces therebetween. A region surrounded by the adjacent scanning lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in the plan view, a gate electrode GE electrically coupled to a corresponding one of the scanning lines GL.

As illustrated in FIG. 10, the scanning lines GL are wiring of a metal such as molybdenum (Mo) or aluminum (Al), a multilayered body of these metals, or an alloy thereof. The signal lines SL are wiring of a metal such as aluminum or an alloy thereof.

As illustrated in FIG. 10, the semiconductor layer SC is provided so as not to protrude from the gate electrode GE in the plan view. As a result, the light-source light L traveling toward the semiconductor layer SC from the gate electrode GE side is reflected, and light leakage is less likely to occur in the semiconductor layer SC.

As illustrated in FIG. 10, source electrodes SE are formed such that two electrical conductors that are the same as the signal line SL extend from the signal line SL in the same layer as that of the signal line SL and in a direction intersecting the signal line. With this configuration, the source electrodes SE electrically coupled to the signal line SL overlap one end of the semiconductor layer SC in the plan view.

As illustrated in FIG. 10, in the plan view, a drain electrode DE is provided in a position between the adjacent electrical conductors of the source electrodes SE. The drain electrode DE overlaps the semiconductor layer SC in the plan view. A portion of the semiconductor layer SC overlapping neither the source electrodes SE nor the drain electrode DE serves as a channel of the switching element Tr. As illustrated in FIG. 13, a contact electrode DEA electrically coupled to the drain electrode DE is electrically coupled to the pixel electrode PE through a contact hole CH.

As illustrated in FIG. 14, the array substrate 10 includes a first light-transmitting base 19 formed of, for example, glass. The material of the first light-transmitting base 19 may be any material having a light transmitting capability and may be, for example, a resin such as polyethylene terephthalate.

As illustrated in FIG. 14, a first insulating layer 11 is provided on the first light-transmitting base 19, and the scanning line GL (refer to FIG. 10) and the gate electrode GE are provided on the first insulating layer 11.

As illustrated in FIG. 14, a first insulating layer 11 is provided so as to cover the scanning line GL and the gate electrode GE. The first insulating layer 11 and the second insulating layer 12 are formed of, for example, a transparent inorganic insulating material such as silicon nitride.

The semiconductor layer SC is stacked on the first insulating layer 11. The semiconductor layer SC is made of, for example, amorphous silicon, but may be made of polysilicon or an oxide semiconductor.

The source electrodes SE covering portions of the semiconductor layer SC, the signal line SL, and the drain electrode DE covering a portion of the semiconductor layer SC are provided on the first insulating layer 11. The drain electrode DE is formed of the same material as that of the signal line SL. A third insulating layer 13 is provided above the semiconductor layer SC, the signal line SL, and the drain electrode DE. The third insulating layer 13 is formed of, for example, a light-transmitting organic insulating material such as an acrylic resin. The third insulating layer 13 has a film thickness greater than other insulating films formed of an inorganic material. As a result, the switching element Tr, the scanning line GL, and the signal line SL are separated by a relatively large distance from the holding capacitance electrode IO, and thus, are less affected by the common potential from the holding capacitance electrode IO.

As illustrated in FIG. 14, the holding capacitance electrode IO is provided on the third insulating layer 13. The holding capacitance electrode IO is formed of a light-transmitting conductive material such as indium tin oxide (ITO). As illustrated in FIG. 11, the holding capacitance electrode IO is formed of a solid film, and only portions thereof overlapping the contact holes CH and surrounding portions thereof are bored out. The holding capacitance electrode IO extends across the adjacent pixels Pix and is provided over the pixels Pix.

As illustrated in FIG. 14, a portion on the holding capacitance electrode IO is provided with a conductive metal layer TM. The conductive metal layer TM is wiring of a metal such as molybdenum (Mo) or aluminum (Al), a multilayered body of these metals, or an alloy thereof. As illustrated in FIG. 12, the metal layer TM is provided in regions overlapping the signal lines SL, the scanning lines GL, and the switching elements Tr in the plan view. With this configuration, the metal layer TM is formed into a grid shape, and openings AP surrounded by the metal layer TM are formed.

As illustrated in FIG. 12, the switching element Tr is provided in a region surrounded by the scanning lines GL and the signal lines SL. At least the switching element Tr is covered with the third insulating layer 13 serving as an organic insulating layer, and the metal layer TM having a larger area than that of the switching element Tr is located above the third insulating layer 13. This configuration can reduce light leakage of the switching element Tr.

The metal layer TM may be located below the holding capacitance electrode IO and only needs to be stacked with the holding capacitance electrode IO. Since the metal layer TM has a lower electrical resistance than that of the holding capacitance electrode IO, the potential of the holding capacitance electrode IO is restrained from varying with its position.

As illustrated in FIG. 12, the width of the metal layer TM overlapping the signal line SL is greater than the width of the signal line SL in the plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scanning line GL is greater than the width of the scanning line GL. The width of the metal layer TM and the width of the scanning line GL are lengths in a direction intersecting the extending direction of the scanning line GL.

A fourth insulating layer 14 is provided on the upper side of the holding capacitance electrode IO and the metal layer TM. The fourth insulating layer 14 is formed of, for example, a transparent inorganic insulating material such as silicon nitride.

As illustrated in FIG. 14, the pixel electrode PE is provided on the fourth insulating layer 14. The pixel electrode PE is formed of a light-transmitting conductive material such as ITO. The pixel electrode PE is electrically coupled to the contact electrode DEA through the contact hole CH provided in the fourth insulating layer 14 and the third insulating layer 13. As illustrated in FIG. 13, each of the pixel electrodes PE is partitioned off on a pixel Pix basis. The first orientation film AL1 is provided on the upper side of the pixel electrode PE.

As illustrated in FIG. 14, the counter substrate 20 includes a second light-transmitting base 29 formed of, for example, glass. The material of the second light-transmitting base 29 may be any material having a light transmitting capability and may be, for example, a resin such as polyethylene terephthalate. The second light-transmitting base 29 is provided with the common electrode CE. The common electrode CE is formed of a light-transmitting conductive material such as ITO. The second orientation film AL2 is provided on a surface of the common electrode CE.

As illustrated in FIGS. 12 and 15, in the display device of the first embodiment, a light-blocking layer GS located in the same layer as that of the scanning line GL is provided so as to extend along the signal line SL and overlap a portion of the signal line SL. The light-blocking layer GS is formed of the same material as that of the scanning line GL. The light-blocking layer GS is not provided at a portion where the scanning line GL intersects the signal line SL in the plan view.

As illustrated in FIG. 15, the light-blocking layer GS is provided opposite to the metal layer TM with the signal line SL therebetween. The width of the light-blocking layer GS is greater than that of the signal line SL and less than that of the metal layer TM. The width of the light-blocking layer GS, the width of the metal layer TM, and the width of the signal line SL are lengths in a direction intersecting the extending direction of the signal line SL. In this manner, the light-blocking layer GS has a greater width than that of the signal line SL, and thus, restrains the reflected light reflected by the edges of the signal line SL from being emitted from the display panel 2. As a result, visibility of images is improved in the display device 1.

As illustrated in FIGS. 14 and 15, the counter substrate 20 is provided with a light-blocking layer LS. The light-blocking layer LS is provided in a region overlapping the signal line SL, the scanning line GL, and the switching element Tr in the plan view. As illustrated in FIG. 15, the light-blocking layer LS has a greater width than that of the metal layer TM. This configuration restrains reflected light reflected by edges of the signal line SL, the scanning line GL, and the metal layer TM from being emitted from the display panel 2. As a result, the visibility of images is improved in the display device 1.

As illustrated in FIG. 14, a spacer SP is disposed between the array substrate 10 and the counter substrate 20 and improves uniformity of distance between the array substrate 10 and the counter substrate 20.

As illustrated in FIG. 16, the common potential wiring COML is routed in the peripheral region FR. The common potential wiring COML includes, for example, first common potential wiring COM1 and second common potential wiring COM2. The first common potential wiring COM1 is electrically coupled to the common electrode CE of the counter substrate 20 through a conductive member CP with electrical conductivity. The conductive member CP may be a conductive pillar or may be a sealing material containing conductive particles such as Au particles.

As illustrated in FIG. 16, in the peripheral region FR, the holding capacitance electrode IO is electrically coupled to the second common potential wiring COM2. The metal layer TM is disposed in the display region AA.

As described above, the display device 1 includes the array substrate 10, the counter substrate 20, the liquid crystal layer 50, and the light emitters 31. The array substrate 10 includes the pixel electrodes PE serving as first light-transmitting electrodes each disposed in a corresponding one of the pixels Pix. The counter substrate 20 includes positions that overlap the pixel electrodes PE in the plan view and are provided with the common electrode CE serving as a second light-transmitting electrode. The liquid crystal layer 50 includes the polymer-dispersed liquid crystals LC filled between the array substrate 10 and the counter substrate 20. The light emitters 31 emit the light that propagates in the array substrate 10 and the counter substrate 20 toward one of the side surfaces of the counter substrate 20. The light emitters 31 may emit the light that propagates in the array substrate 10 and the counter substrate 20 toward one of the side surfaces of the array substrate 10.

The array substrate includes, in each of the pixels Pix, the holding capacitance electrode IO serving as a third light-transmitting electrode that at least partially overlaps the pixel electrode PE in the plan view with the insulating layer interposed therebetween. A constant voltage is applied from the common potential wiring COML to the common electrode CE and the holding capacitance electrode IO so as to have the common potential. This voltage application generates the holding capacitance HC between the pixel electrode PE and the holding capacitance electrode IO. As a result, the written potential of each of the pixel electrodes PE (refer to FIG. 7) is easily held during the first color light emission period RON, the second color light emission period GON, and the third color light emission period BON coming after the one vertical scanning period GateScan. In addition, the time for selecting the scanning lines can be reduced while preventing the degradation in display quality such as the occurrence of the flickers. The visibility of images displayed on the display panel 2 can be improved.

Second Embodiment

Figure 17:
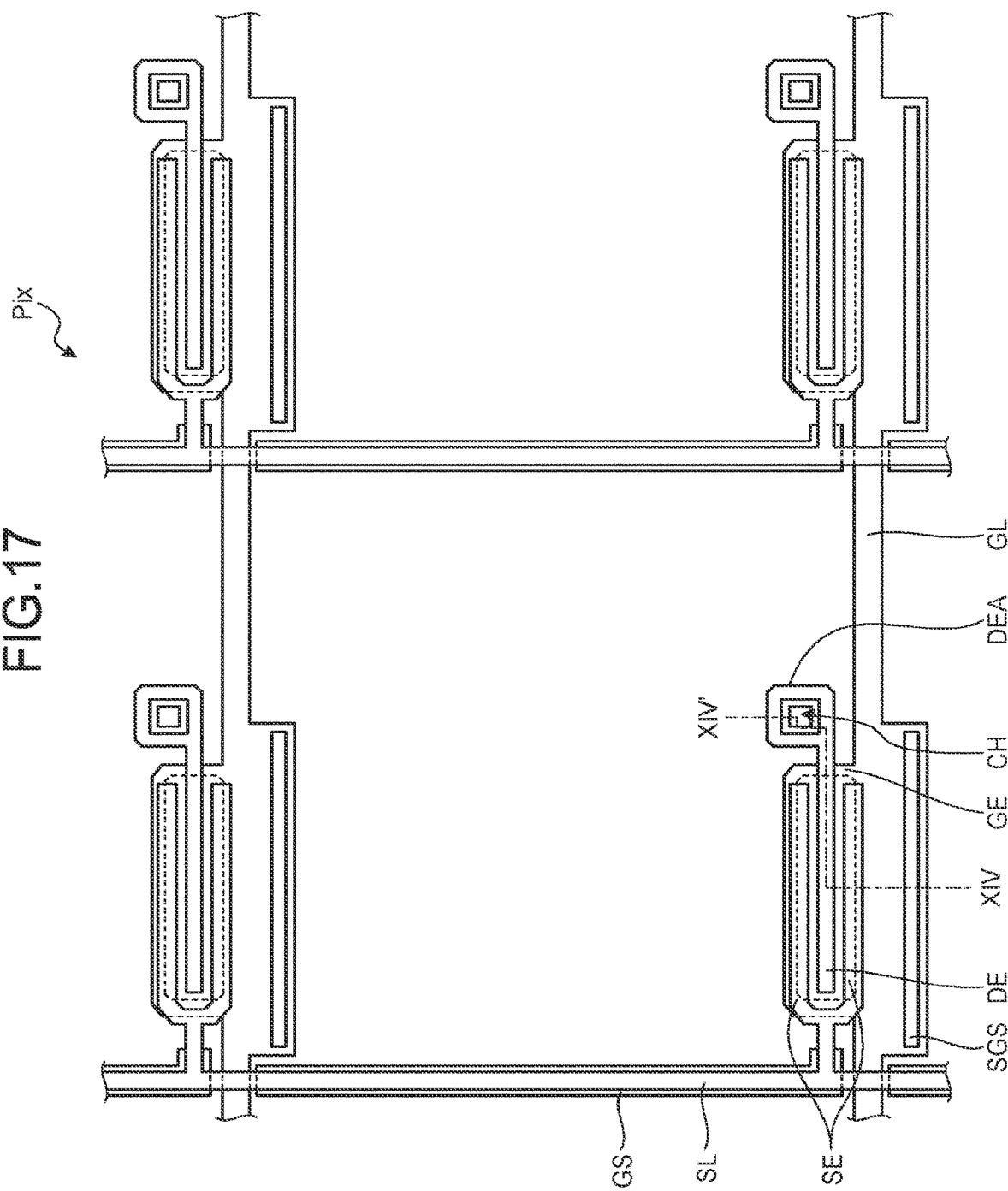
FIG. 17 is a plan view illustrating the scanning line, the signal line, and the switching element in the pixel according to a second embodiment.
Figure 18:
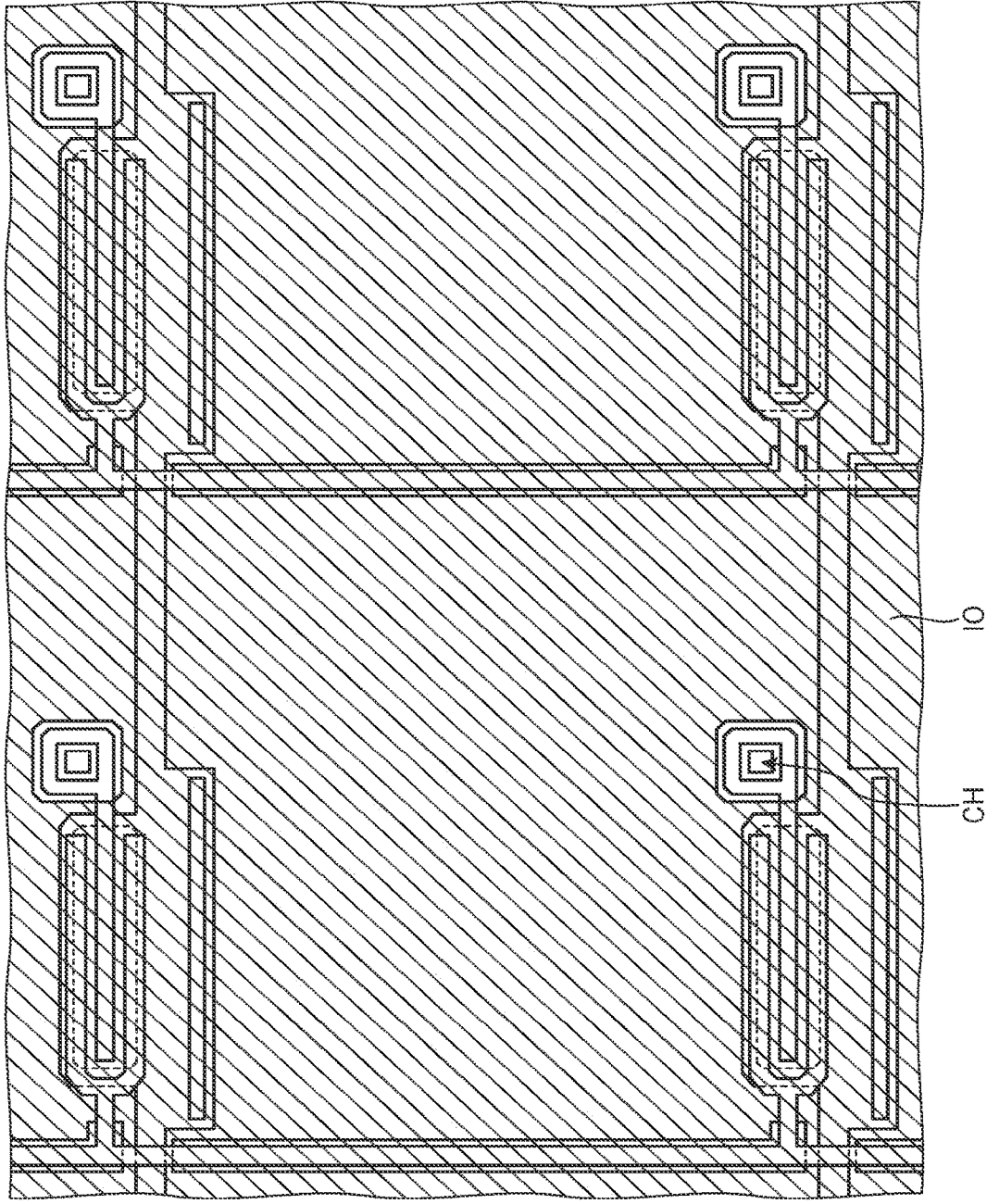
FIG. 18 is a plan view illustrating the holding capacitance layer in the pixel according to the second embodiment.
Figure 19:
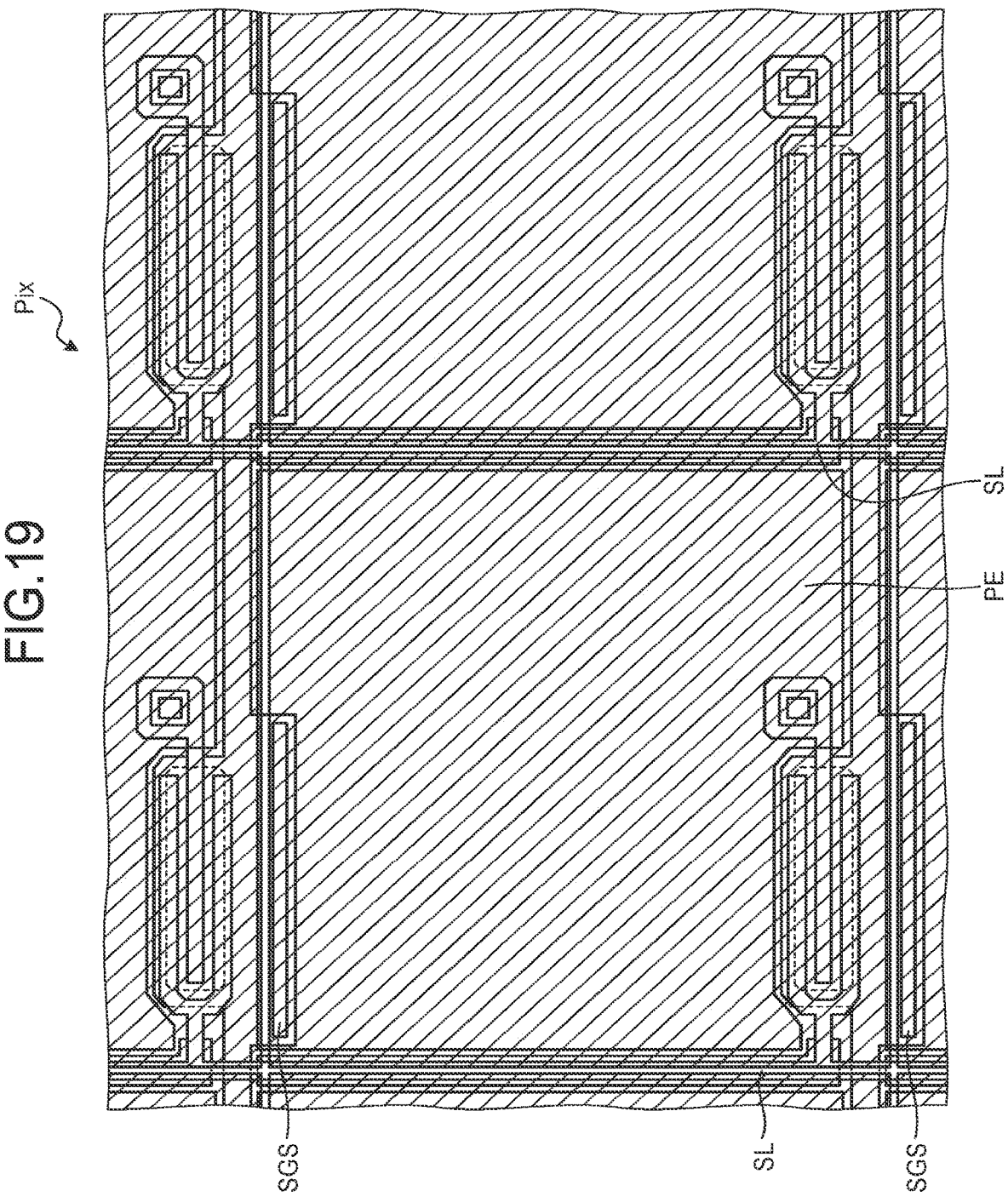
FIG. 19 is a plan view illustrating the pixel electrode in the pixel according to the second embodiment.
Figure 20:
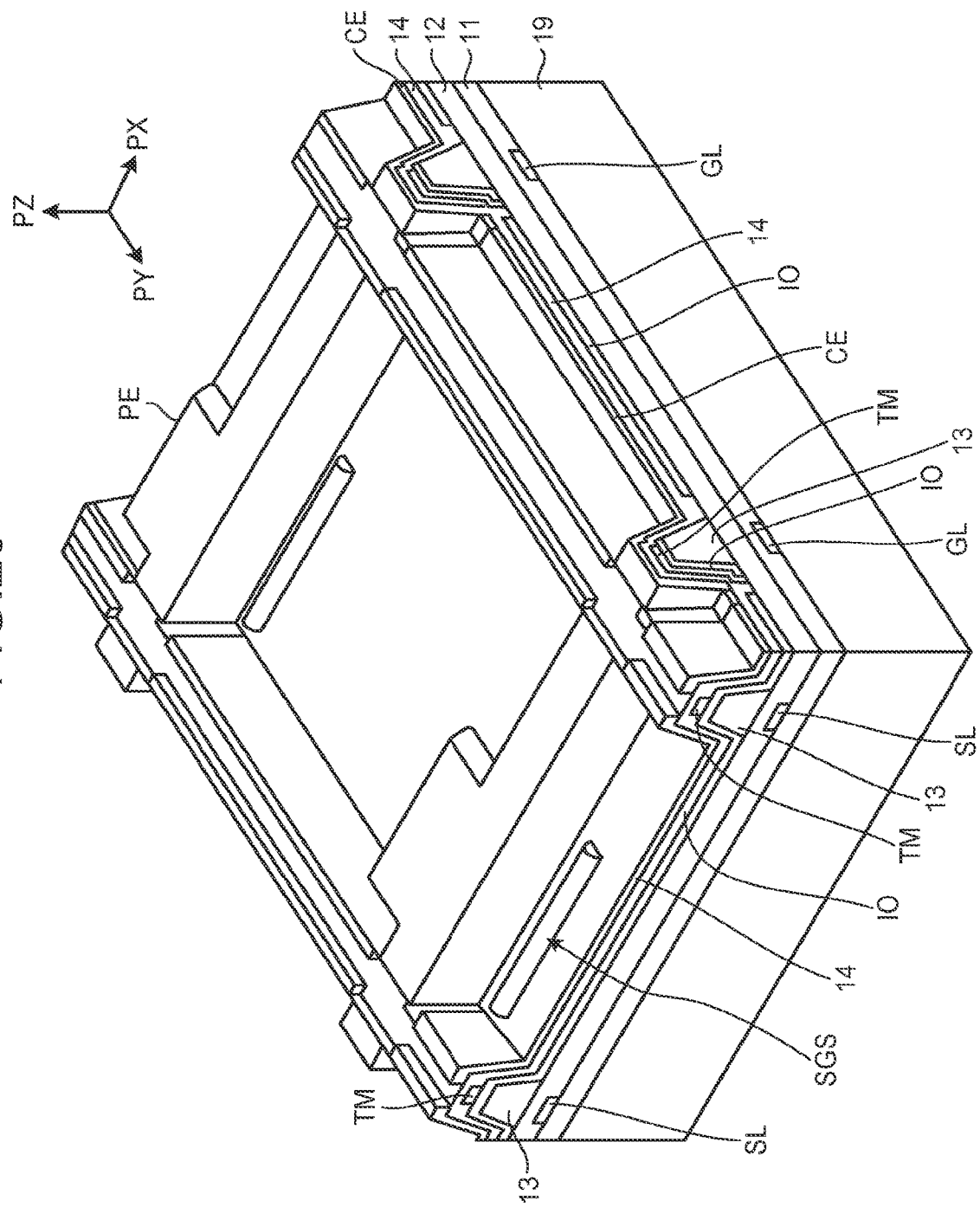
FIG. 20 is a partial perspective view of the pixel according to the second embodiment.
Figure 21:
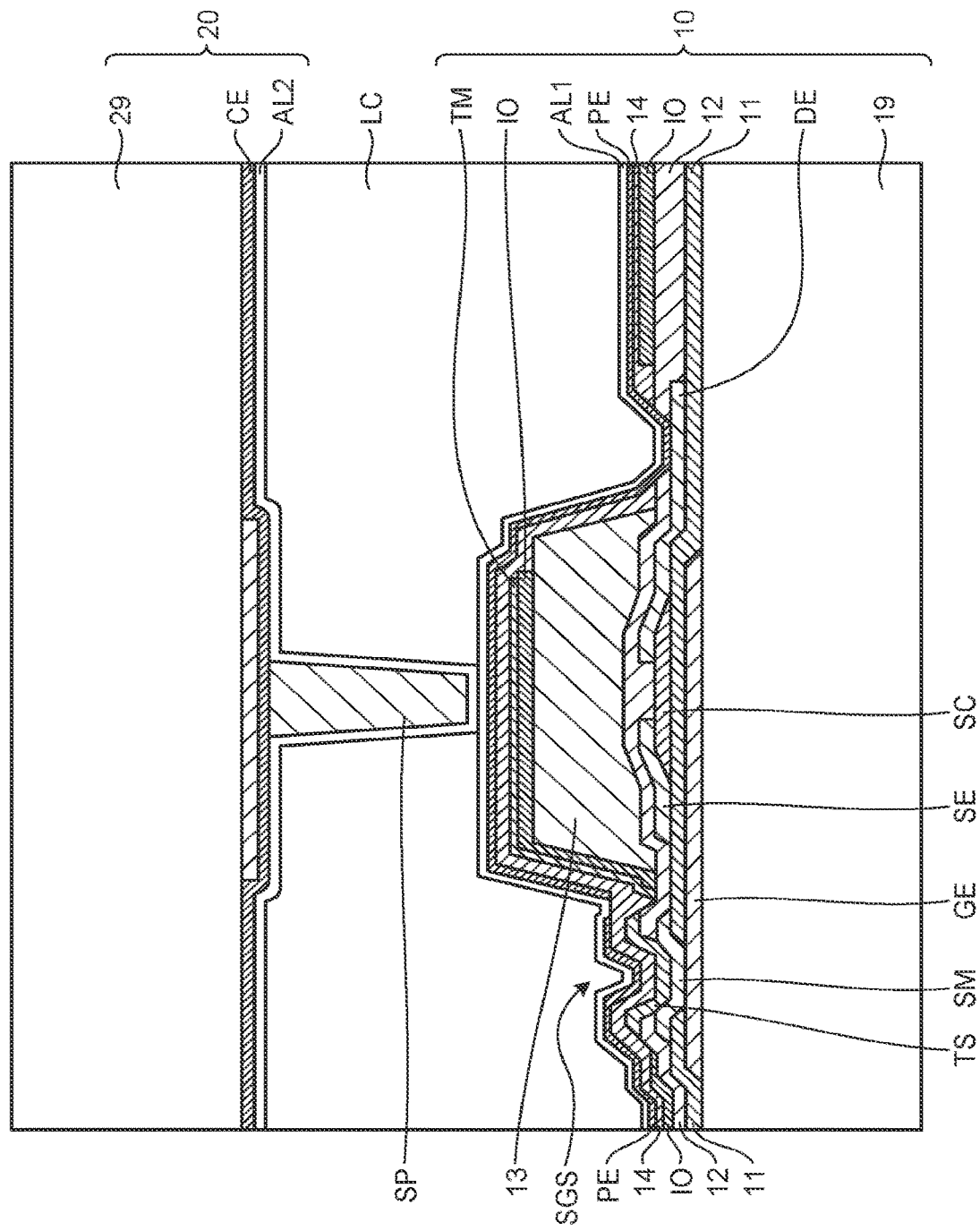
FIG. 21 is a sectional view along XIV-XIV' of FIG. 17.

FIG. 17 is a plan view illustrating the scanning line, the signal line, and the switching element in the pixel according to a second embodiment. FIG. 18 is a plan view illustrating the holding capacitance layer in the pixel according to the second embodiment. FIG. 19 is a plan view illustrating the pixel electrode in the pixel according to the second embodiment. FIG. 20 is a partial perspective view of the pixel according to the second embodiment. FIG. 21 is a sectional view along XIV-XIV' of FIG. 17. The same components as those described in the above-described embodiment are denoted by the same reference numerals, and the duplicate description thereof will not be repeated.

As illustrated in FIG. 17, in the pixel Pix of the second embodiment, the source electrode SE is drawn as one piece from the signal line SL and divided into two branches. The light-blocking layer GS overlaps, in the plan view, a portion of the source electrode SE drawn as the one piece from the signal line SL. This configuration restrains reflected light reflected by edges of the source electrode SE from being emitted from the display panel 2. As a result, the visibility of images is improved in the display device 1.

As illustrated in FIG. 18, the holding capacitance electrode IO is formed of the solid film, and only portions thereof overlapping the contact holes CH and surrounding portions thereof are bored out. The holding capacitance electrode IO extends across the adjacent pixels Pix.

As illustrated in FIG. 19, each of the pixel electrodes PE is partitioned off on a pixel Pix basis, and a portion of the pixel electrode PE overlaps the signal line SL in the plan view. The pixel electrode PE overlaps the scanning line GL on one side thereof in the plan view and is disposed over to the adjacent pixel Pix, but does not overlap the scanning line GL on the other side thereof in the plan view.

As illustrated in FIG. 20, the pixel electrode PE is located above a slant surface of the third insulating layer 13 covering over the signal line SL. This configuration increases the region of the pixel electrode PE and increases the area of the effective pixel Pix.

As illustrated in FIG. 21, the pixel Pix of the second embodiment has a region including the third insulating layer 13 and a region not including the third insulating layer 13. As illustrated in FIG. 20, the region including the third insulating layer 13 is located over the scanning line GL and over the signal line SL. As illustrated in FIG. 20, the third insulating layer 13 has a grid shape that covers over the scanning lines GL and the signal lines SL along the scanning lines GL and the signal lines SL. As illustrated in FIG. 21, the region including the third insulating layer 13 is located over the semiconductor layer SC, that is, over the switching element Tr. As a result, the array substrate 10 has regions surrounded by the scanning lines GL and the signal lines SL where the third insulating layer 13 is not present, and thus, has regions where the thickness of the insulating layers is less than that of the insulating layers overlapping the scanning lines GL and the signal lines SL in the plan view. The regions surrounded by the scanning lines GL and the signal lines SL have relatively higher optical transmittance and higher light transmitting capability than those over the scanning lines GL and over the signal lines SL.

As illustrated in FIG. 1, the light enters in the second direction PY from the side light source 3. The light entrance direction is a direction along the second direction PY. Accordingly, as illustrated in FIG. 17, a light-blocking structure SGS is provided on a side of the switching element Tr closer to the light emitters 31 of the side light source 3 in the light entrance direction. In the first direction PX intersecting the light entrance direction, the length of the light-blocking structure SGS is longer than the length of the switching element Tr. This configuration allows the light-blocking structure SGS to block a light path of the light propagating toward the switching element Tr and reduce the light leakage of the switching element Tr.

The light-blocking structure SGS is formed such that the gate electrode GE of the switching element Tr extends, and a first light-blocking layer SM formed of a conductive material located in the same layer as that of the signal line is stacked on the upper side of a conductive material located in the same layer as that of the scanning line. A second light-blocking layer TS formed of the same conductive material as that of the metal layer is stacked on the upper side of the first light-blocking layer SM.

As illustrated in FIG. 21, the semiconductor layer SC of the switching element Tr is covered with the third insulating layer 13 serving as the organic insulating layer, and the slant surface of the third insulating layer 13 in the light entrance direction where the light-blocking structure SGS is located is covered with the metal layer TM. This configuration allows the metal layer TM to block the light path of the light propagating toward the switching element Tr, and reduce the light leakage of the switching element Tr.

The pixel electrode PE is stacked above the second light-blocking layer TS with the fourth insulating layer 14 interposed therebetween. With this configuration, the polymer-dispersed liquid crystal LC above the light-blocking structure SGS can also contribute to the scattering.

As illustrated in FIGS. 19 and 21, the pixel electrode PE disposed over the light-blocking structure SGS is disposed in the pixel Pix different from the pixel Pix in which the pixel electrode disposed over the switching element Tr. The pixel electrode PE disposed over the light-blocking structure SGS and the pixel electrode disposed over the switching element Tr are uncoupled from each other and do not short each other.

Third Embodiment

Figure 22:
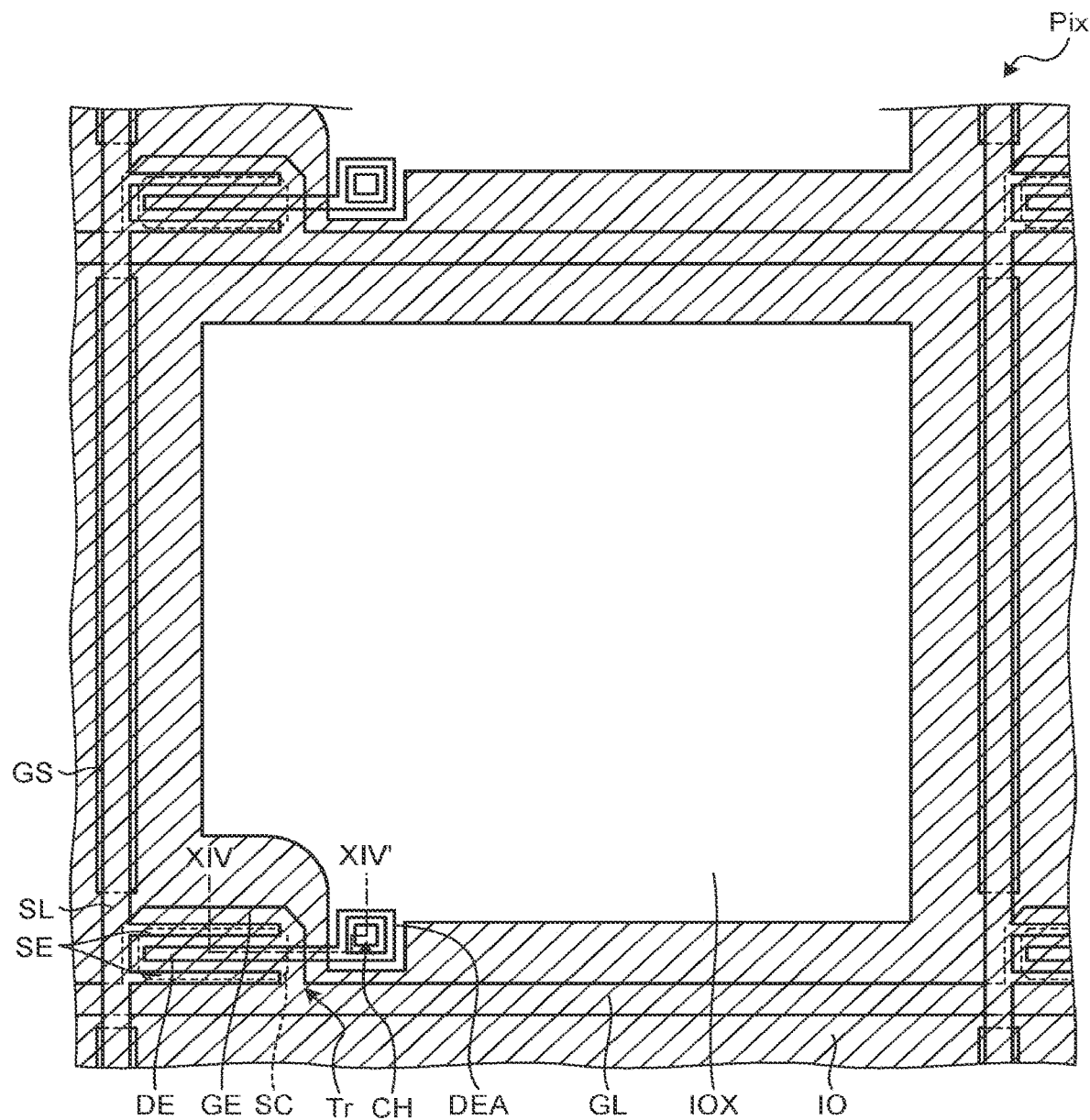
FIG. 22 is a plan view illustrating the holding capacitance layer in the pixel according to a third embodiment.

FIG. 22 is a plan view illustrating the holding capacitance layer in the pixel according to a third embodiment. The same components as those described in either of the above-described embodiments are denoted by the same reference numerals, and the duplicate description thereof will not be repeated.

The shape of the holding capacitance electrode IO for the pixels Pix of the third embodiment differs from that for the pixels Pix of the first embodiment. In the third embodiment, the holding capacitance electrode IO has a region IOX including no light-transmitting conductive material in each of the regions surrounded by the scanning lines GL and the signal lines SL.

For example, the holding capacitance electrode IO of the third embodiment has a grid shape that covers over the scanning lines GL and the signal lines SL along the scanning lines GL and the signal lines SL. This configuration reduces the capacitance of the holding capacitance HC between the region IOX including no light-transmitting conductive material and the pixel electrode PE, and thus, the holding capacitance HC is adjusted by the size of the region IOX including no light-transmitting conductive material.

The holding capacitance electrode IO of the third embodiment can be applied to the pixels Pix of the second embodiment.

Fourth Embodiment

Figure 23:
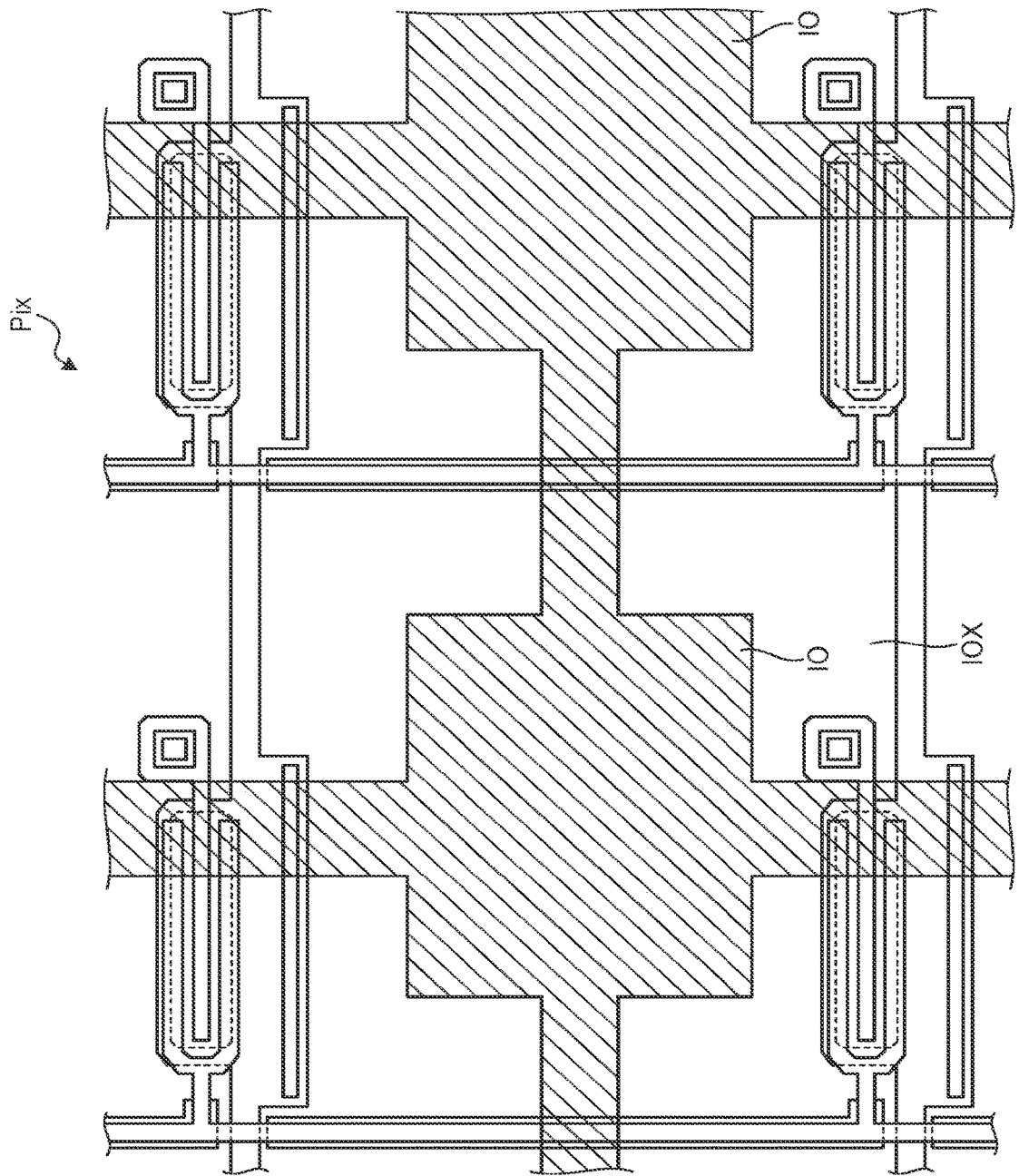
FIG. 23 is a plan view illustrating the holding capacitance layer in the pixel according to a fourth embodiment.

FIG. 23 is a plan view illustrating the holding capacitance layer in the pixel according to a fourth embodiment. The same components as those described in any one of the above-described embodiments are denoted by the same reference numerals, and the duplicate description thereof will not be repeated.

The shape of the holding capacitance electrode IO for the pixels Pix of the fourth embodiment differs from that for the pixels Pix of the second embodiment. In the fourth embodiment, the holding capacitance electrode IO has a plurality of the regions IOX including no light-transmitting conductive material in each of the regions surrounded by the scanning lines GL and the signal lines SL. The region of the holding capacitance electrode IO including the light-transmitting conductive material overlaps the scanning line GL or the signal line SL and extends to the adjacent pixel Pix. This configuration reduces the capacitance of the holding capacitance HC between the regions IOX including no light-transmitting conductive material and the pixel electrode PE, and thus, the holding capacitance HC is adjusted by the size of the regions IOX including no light-transmitting conductive material.

Fifth Embodiment

Figure 24:
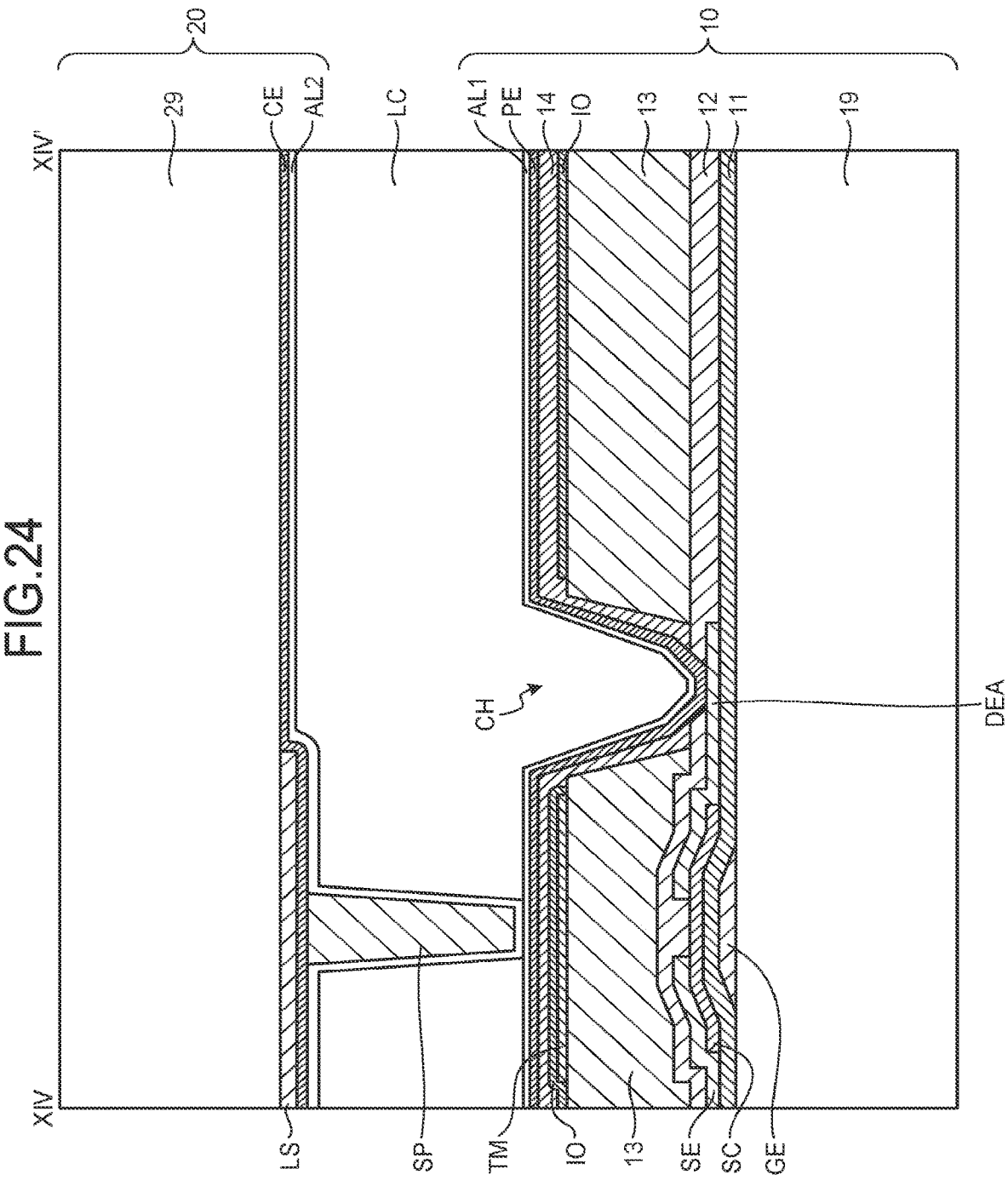
FIG. 24 is a sectional view along XIV-XIV' of FIG. 12 in the pixel according to a fifth embodiment.
Figure 25:
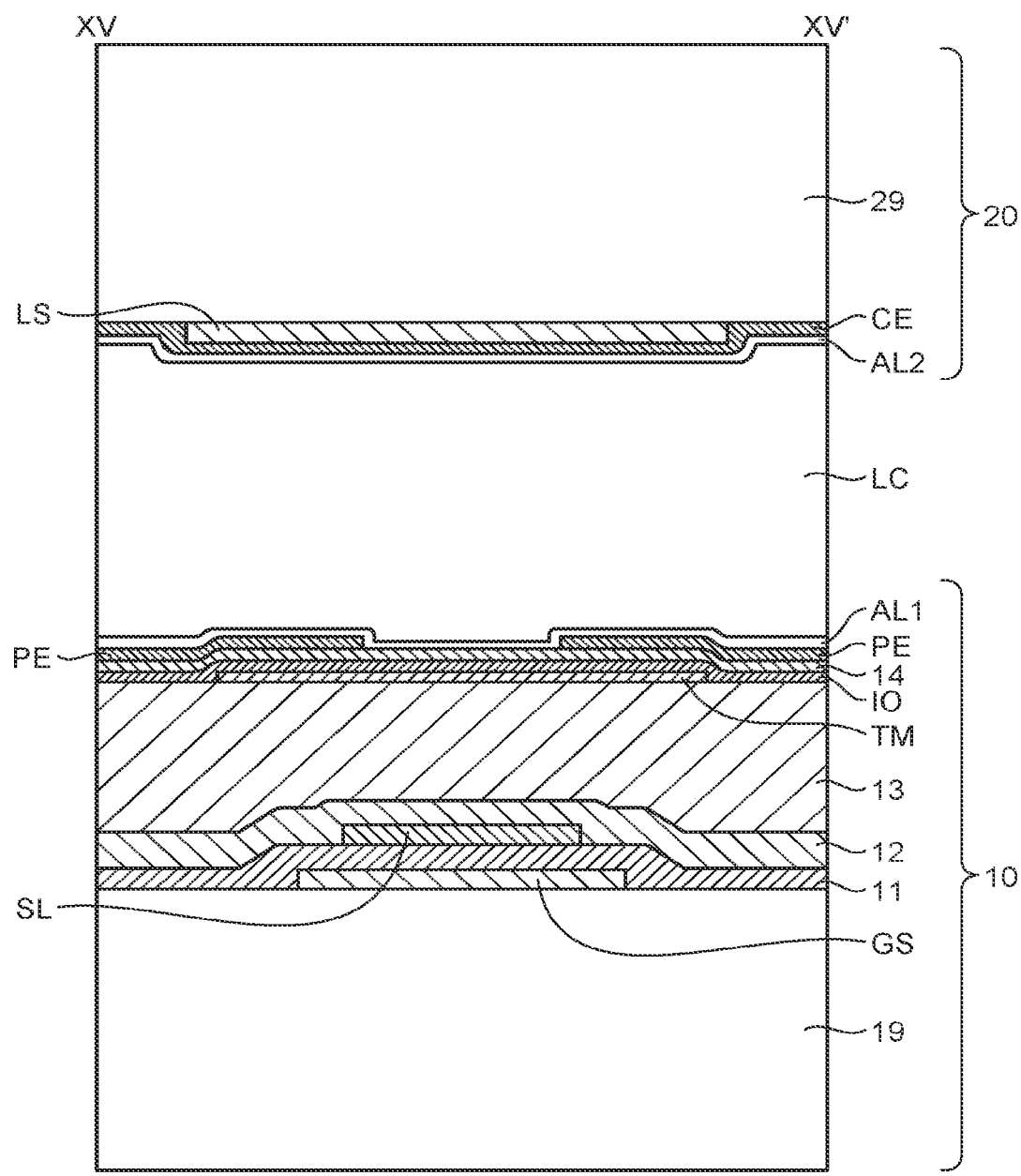
FIG. 25 is a sectional view along XV-XV' of FIG. 12 in the pixel according to the fifth embodiment.

FIG. 24 is a sectional view along XIV-XIV' of FIG. 12 in the pixel according to a fifth embodiment. FIG. 25 is a sectional view along XV-XV' of FIG. 12 in the pixel according to the fifth embodiment. The same components as those described in any one of the above-described embodiments are denoted by the same reference numerals, and the duplicate description thereof will not be repeated.

The pixel Pix of the fifth embodiment differs from the pixel Pix of the first embodiment in stacking order of the holding capacitance electrode IO and the metal layer TM. As illustrated in FIGS. 24 and 25, the metal layer TM is located on the lower side of the holding capacitance electrode 10. In other words, the holding capacitance electrode IO is stacked on the upper side of the metal layer TM. The metal layer TM is covered with the holding capacitance electrode IO. Since the metal layer TM has a lower electrical resistance than that of the holding capacitance electrode IO, the potential of the holding capacitance electrode IO is restrained from varying with position.

(Modifications)

While the first to the fifth embodiments have been described on the assumption that the switching element Tr has a bottom-gate structure, the switching element Tr is not limited to the bottom-gate structure, and may have a top-gate structure, as described above. If the switching element Tr has the top-gate structure, referring to the insulating film stacking structure of FIG. 14, the structure is such that the semiconductor layer SC is disposed between the first light-transmitting base 19 and the first insulating layer, the gate electrode GE is disposed between the first insulating layer 11 and the second insulating layer 12, and the source electrode SE and the contact electrode DEA are formed between the second insulating layer 12 and the third insulating layer 13.

In addition, a direct-current voltage may be supplied as the common potential. In other words, the common potential may be constant. Alternatively, an alternating-current voltage may be shared as the common potential. In other words, the common potential may have two values of an upper limit value and a lower limit value. Whether the common potential is a direct-current potential or an alternating-current potential, the common potential is supplied to the holding capacitance electrode IO and the common electrode CE.

As the third insulating layer 13 of the third embodiment serving as a grid-shaped organic insulating film illustrated in FIGS. 20 and 21, the structure is disclosed in which the third insulating layer 13 inside the grid-shaped region is completely removed, and the second insulating layer 12 and the holding capacitance electrode IO in the lower layers are exposed. However, the present disclosure is not limited to this structure. For example, the structure may be such that a thin portion of the film thickness of the third insulating layer 13 is left inside the grid-shaped region surrounded by the signal lines SL and the scanning lines GL using a halftone exposure technique. With this structure, the film thickness of the third insulating layer 13 inside the grid-shaped region is less than the film thickness of the grid-shaped region surrounded by the signal lines SL and the scanning lines GL.

While the preferred embodiments have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

What is claimed is:

1. A display panel comprising:
   an array substrate including:
      a plurality of pixels arranged in a matrix having a row-column configuration in a display region,
      an organic insulating layer,
      a first inorganic insulating layer covering the organic insulating layer,
      a first light-transmitting electrode between the organic insulating layer and the first inorganic insulating layer, and
      a metal layer between the organic insulating layer and the first inorganic insulating layer and having a first grid shape in the display region;
   a counter substrate; and
   a liquid crystal layer including polymer-dispersed liquid crystals and disposed between the array substrate and the counter substrate,
   wherein
   the organic insulating layer has a second grid shape in the display region,
   the first light-transmitting electrode has a third grid shape in the display region,
   the organic insulating layer having the second grid shape overlaps the first light-transmitting electrode having the third grid shape,
   the first light-transmitting electrode having the third grid shape (1) overlaps the metal layer that has the first grid shape and (2) contains a plurality of openings defined by the third grid shape and surrounded by the first grid shape of the metal layer, and
   the metal layer having the first grid shape is in contact with the first light-transmitting electrode that has the third grid shape.

2. The display panel according to claim 1, wherein the array substrate further comprises:
   a second inorganic insulating layer,
   a plurality of second light-transmitting electrodes each disposed in a corresponding one of the pixels, and
   an alignment film;
   the organic insulating layer having the second grid shape includes a plurality of openings, and is disposed between the first inorganic insulating layer and the second inorganic insulating layer,
   the second light-transmitting electrodes are between the first inorganic insulating layer and the alignment film,
   each of the second light-transmitting electrodes overlaps a corresponding one of the plurality of openings of the organic insulating layer having the second grid shape, and
   each of the plurality of openings of the first light-transmitting electrode that has the third grid shape overlaps a corresponding one of the plurality of openings of the organic insulating layer that has the second grid shape.

3. The display panel according to claim 2, wherein the second light-transmitting electrodes overlap the first light-transmitting electrode having the third grid shape, above the organic insulating layer having the second grid shape, and
   each of the second light-transmitting electrodes overlaps a corresponding one of the plurality of openings of the first light-transmitting electrode that has the third grid shape.

4. The display panel according to claim 3, wherein
   the counter substrate comprises a third light-transmitting electrode overlapping the second light-transmitting electrodes,
   the third light-transmitting electrode overlaps the plurality of openings of the first light-transmitting electrode that has the third grid shape,
   the first light-transmitting electrode is a capacitance electrode,
   the second light-transmitting electrodes are pixel electrodes, and the third light-transmitting electrode is a common electrode.

5. The display panel according to claim 4, wherein
the array substrate further comprises a plurality of scanning lines arranged in rows, and a plurality of signal lines arranged in columns,
the organic insulating layer having the second grid shape covers the scanning lines and the signal lines,
the capacitance electrode having the third grid shape overlaps the scanning lines and the signal lines,
the metal layer having the first grid shape overlaps the scanning lines and the signal lines, and
the plurality of openings of the capacitance electrode are disposed in regions surrounded by the scanning lines and the signal lines.

6. The display panel according to claim 1, wherein
the counter substrate comprises a light-blocking layer and a third light-transmitting electrode,
the light-blocking layer has a fourth grid shape in the display region,
the third light-transmitting electrode is in contact with the light-blocking layer having the fourth grid shape, and
the organic insulating layer having the second grid shape overlaps the light-blocking layer having the fourth grid shape.

7. The display panel according to claim 6, wherein
the first light-transmitting electrode having the third grid shape overlaps the light-blocking layer having the fourth grid shape, and
the metal layer having the first grid shape overlaps the light-blocking layer having the fourth grid shape.

8. The display panel according to claim 7, wherein
the array substrate further comprises a second inorganic insulating layer, a plurality of second light-transmitting electrodes each disposed in a corresponding one of the pixels, and an alignment film,
the organic insulating layer having the second grid shape includes a plurality of openings and is disposed between the first inorganic insulating layer and the second inorganic insulating layer,
the second light-transmitting electrodes are between the first inorganic insulating layer and the alignment film,
each of the second light-transmitting electrodes overlaps the corresponding one of the plurality of openings of the organic insulating layer,
each of the second light-transmitting electrodes overlaps a corresponding one of the plurality of openings of the first light-transmitting electrode that has the third grid shape, and
each of the second light-transmitting electrodes overlaps a third light-transmitting electrode.

9. A display device comprising:
an array substrate including:
a plurality of pixels arranged in a matrix having a row-column configuration in a display region,
an organic insulating layer,
a first inorganic insulating layer covering the organic insulating layer,
a first light-transmitting electrode between the organic insulating layer and the first inorganic insulating layer, and
a metal layer between the organic insulating layer and the first inorganic insulating layer and having a first grid shape in the display region;
a glass substrate opposed to the array substrate;
a liquid crystal layer, including polymer-dispersed liquid crystals, between the array substrate and the glass substrate; and
a side light source configured to emit light toward a side surface of the glass substrate,
wherein
the organic insulating layer has a second grid shape in the display region,
the first light-transmitting electrode has a third grid shape in the display region,
the organic insulating layer overlaps the third grid shape of the first light-transmitting electrode,
the first light-transmitting electrode having the third grid shape (1) overlaps the metal layer having the first grid shape and (2) contains a plurality of openings defined by the third grid shape and surrounded by the first grid shape of the metal layer, and
the metal layer having the first grid shape is in contact with the first light-transmitting electrode having the third grid shape.

10. The display device according to claim 9, wherein
the array substrate further comprises:
a second inorganic insulating layer,
a plurality of second light-transmitting electrodes each disposed in a corresponding one of the pixels, and
an alignment film;
the organic insulating layer having the second grid shape includes a plurality of openings, and is disposed between the first inorganic insulating layer and the second inorganic insulating layer,
the second light-transmitting electrodes are between the first inorganic insulating layer and the alignment film,
each of the plurality of openings of the first light-transmitting electrode that has the third grid shape overlaps a corresponding one of the plurality of openings of the organic insulating layer that has the second grid shape, and
each of the second light-transmitting electrodes overlaps a corresponding one of the plurality of openings of the first light-transmitting electrode that has the third grid shape.

11. The display device according to claim 10, wherein the second light-transmitting electrodes overlap the first light-transmitting electrode having the third grid shape, above the organic insulating layer having the second grid shape, and
each of the second light-transmitting electrodes overlaps a corresponding one of the plurality of openings of the first light-transmitting electrode that has the third grid shape.

12. The display device according to claim 11, further comprising a third light-transmitting electrode that is in contact with the glass substrate, wherein
the third light-transmitting electrode overlaps the second light-transmitting electrodes in the display region,
the third light-transmitting electrode overlaps the plurality of openings of the first light-transmitting electrode that has the third grid shape,
the first light-transmitting electrode is a capacitance electrode,
the second light-transmitting electrodes are pixel electrodes, and
the third light-transmitting electrode is a common electrode.

13. The display device according to claim 12, wherein
the array substrate further comprises a plurality of scanning lines arranged in rows, and a plurality of signal lines arranged in columns, and the organic insulating layer having the second grid shape covers the scanning lines and the signal lines, the capacitance electrode having the third grid shape overlaps the scanning lines and the signal lines, the metal layer having the first grid shape overlaps the scanning lines and the signal lines, and the plurality of openings of the capacitance electrode are disposed in regions surrounded by the scanning lines and the signal lines.

14. The display device according to claim 9, further comprising a light-blocking layer that is in contact with the glass substrate, and a third light-transmitting electrode that is in contact with the glass substrate, wherein the light-blocking layer has a fourth grid shape in the display region and includes a plurality of plurality of openings, the light-blocking layer having the fourth grid shape is disposed between the third light-transmitting electrode and the glass substrate, the third light-transmitting electrode is in contact with the glass substrate in a corresponding one of the plurality of openings of the light-blocking layer having the fourth grid shape, the third light-transmitting electrode is in contact with the light-blocking layer having the fourth grid shape, and the organic insulating layer having the grid shape overlaps the light-blocking layer having the fourth grid shape.

15. The display device according to claim 14, wherein
the first light-transmitting electrode having the third grid shape overlaps the light-blocking layer having the fourth grid shape, and the metal layer having the first grid shape overlaps the light-blocking layer having the fourth grid shape.

16. The display device according to claim 15, wherein the array substrate further comprises a second inorganic insulating layer, a plurality of second light-transmitting electrodes each disposed in a corresponding one of the pixels, and an alignment film, the organic insulating layer having the third grid shape includes a plurality of openings and is disposed between the first inorganic insulating layer and the second inorganic insulating layer, the second light-transmitting electrodes are between the first inorganic insulating layer and the alignment film, each of the second light-transmitting electrodes overlaps the corresponding one of the plurality of openings of the organic insulating layer, and each of the second light-transmitting electrodes overlaps a third light-transmitting electrode.

17. The display panel according to claim 1, wherein the organic insulating layer having the second grid shape, the first light-transmitting electrode having the third grid shape and containing the plurality of openings defined by the third grid shape and surrounded by the first grid shape of the metal layer, and the metal layer having the first grid shape are sequentially stacked in the array substrate.

18. The display panel according to claim 9, wherein the organic insulating layer having the second grid shape, the first light-transmitting electrode having the third grid shape and containing the plurality of openings defined by the third grid shape and surrounded by the first grid shape of the metal layer, and the metal layer having the first grid shape are sequentially stacked in the array substrate.

19. The display panel according to claim 1, wherein the plurality of openings defined by the third grid shape of the first light-transmitting electrode are concentric with a plurality of openings defined by the first grid shape of the metal layer.

20. The display panel according to claim 9, wherein the plurality of openings defined by the third grid shape of the first light-transmitting electrode are concentric with a plurality of openings defined by the first grid shape of the metal layer.

* * * * *